(12) United States Patent
Dasdan et al.

(10) Patent No.: US 12,058,220 B2
(45) Date of Patent: Aug. 6, 2024

(54) MULTI-SOURCE EVENT FEEDS WITH ACTIONABLE INPUTS

(71) Applicants: Atlassian Pty Ltd., Sydney (AU); Atlassian Inc., San Francisco, CA (US)

(72) Inventors: Ali Dasdan, Mountain View, CA (US); Sanjay Ghatare, San Jose, CA (US); Balazs Nagy, Mountain View, CA (US); Timothy Clipsham, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/488,845

(22) Filed: Sep. 29, 2021

(65) Prior Publication Data
US 2023/0102653 A1 Mar. 30, 2023

(51) Int. Cl.
*H04L 67/50* (2022.01)
*H04L 41/00* (2022.01)
(Continued)

(52) U.S. Cl.
CPC ............ *H04L 67/535* (2022.05); *H04L 41/20* (2013.01); *H04L 41/22* (2013.01);
(Continued)

(58) Field of Classification Search
CPC .. G06Q 10/103; G06Q 10/1097; G06Q 10/10; G06Q 10/101; H04L 41/20;
(Continued)

(56) References Cited

U.S. PATENT DOCUMENTS

| 5,737,442 A | 4/1998 | Alam |
| 6,424,354 B1 | 7/2002 | Matheny |

(Continued)

OTHER PUBLICATIONS

Author Unknown, "3 Free Gmail Desktop Notification Software for Windows," https://www.ilovefreesoftware.com/21/windows/3-free-gmail-desktop-notification-software-windows.html, pp. 1-5, Nov. 2013.
(Continued)

*Primary Examiner* — Vivek Srivastava
*Assistant Examiner* — William C McBeth
(74) *Attorney, Agent, or Firm* — Brownstein Hyatt Farber Schreck, LLP

(57) ABSTRACT

A method for displaying an event feed to a user includes, at an event feed service in communication with an issue tracking system and a collaborative document system, receiving, from an issue tracking system including a plurality of issue tickets, a notification of an event associated with an issue ticket and a reference to the issue ticket, and receiving, from a collaborative document system including a plurality of user-generated documents, a notification of an event associated with a user-generated document and including a reference to the user-generated document. The method may further include causing at least a portion of an event feed to be displayed to the user, the event feed including a first feed item including a first actionable input object configured to cause a modification of the issue, and a second feed item including a second actionable input object configured to cause a modification of the user-generated document.

15 Claims, 13 Drawing Sheets

(51) Int. Cl.
*H04L 41/22* (2022.01)
*H04L 41/5061* (2022.01)
*H04L 41/5074* (2022.01)
*H04L 67/55* (2022.01)

(52) U.S. Cl.
CPC ...... *H04L 41/5064* (2013.01); *H04L 41/5074* (2013.01); *H04L 67/55* (2022.05)

(58) Field of Classification Search
CPC ... H04L 41/22; H04L 41/5064; H04L 41/507; H04L 51/04; H04L 51/046; H04L 67/535; H04L 67/55
See application file for complete search history.

(56) References Cited

U.S. PATENT DOCUMENTS

| | | | |
|---|---|---|---|
| 9,117,058 B1 | 8/2015 | Ansari | |
| 9,971,468 B2 | 5/2018 | Ryall et al. | |
| 10,146,394 B2 | 12/2018 | Ryall et al. | |
| 10,146,742 B1* | 12/2018 | Krappe | G06Q 10/101 |
| 10,616,150 B2 | 4/2020 | Faulkner et al. | |
| 10,764,233 B1* | 9/2020 | Goldberg | H04L 51/56 |
| 10,908,793 B2 | 2/2021 | Latzina et al. | |
| 11,240,247 B2 | 2/2022 | Jain et al. | |
| 11,314,563 B1* | 4/2022 | Singh | G06F 21/6218 |
| 2002/0174183 A1 | 11/2002 | Saeidi | |
| 2003/0229859 A1 | 12/2003 | Shiraishi | |
| 2004/0015781 A1 | 1/2004 | Brown | |
| 2004/0123186 A1 | 6/2004 | Kulp | |
| 2005/0243371 A1 | 11/2005 | Kanaya | |
| 2006/0069989 A1 | 3/2006 | Jones | |
| 2007/0124285 A1* | 5/2007 | Wright | G06F 16/24556 |
| 2008/0235585 A1 | 9/2008 | Hart | |
| 2009/0260022 A1 | 10/2009 | Louch | |
| 2009/0327850 A1 | 12/2009 | Obrecht et al. | |
| 2010/0095197 A1 | 4/2010 | Klevenz | |
| 2010/0318924 A1 | 12/2010 | Frankel et al. | |
| 2011/0004845 A1 | 1/2011 | Ciabarra | |
| 2011/0010641 A1 | 1/2011 | Wolff | |
| 2011/0126123 A1 | 5/2011 | Reter | |
| 2011/0205594 A1 | 8/2011 | Chida | |
| 2011/0212430 A1 | 9/2011 | Smithmier et al. | |
| 2011/0225526 A1 | 9/2011 | Baret | |
| 2011/0264705 A1 | 10/2011 | Diamond | |
| 2011/0307883 A1 | 12/2011 | Hilerio et al. | |
| 2012/0032945 A1 | 2/2012 | Dare | |
| 2012/0036442 A1 | 2/2012 | Dare et al. | |
| 2012/0079004 A1 | 3/2012 | Herman | |
| 2012/0102114 A1 | 4/2012 | Dunn | |
| 2012/0295648 A1 | 11/2012 | Naaman | |
| 2012/0296919 A1 | 11/2012 | Sinha | |
| 2013/0024511 A1 | 1/2013 | Dunn | |
| 2013/0091149 A1 | 4/2013 | Dunn | |
| 2013/0179799 A1* | 7/2013 | Savage | G06Q 10/103 715/751 |
| 2013/0205246 A1 | 8/2013 | Schmidt et al. | |
| 2013/0218845 A1 | 8/2013 | Kleppner | |
| 2013/0254699 A1 | 9/2013 | Bashir | |
| 2013/0262476 A1* | 10/2013 | Barak | G06F 16/9577 707/748 |
| 2013/0311890 A1 | 11/2013 | Cui | |
| 2014/0053060 A1 | 2/2014 | Walker | |
| 2014/0081959 A1* | 3/2014 | Kass | H04L 67/535 707/723 |
| 2014/0082525 A1 | 3/2014 | Kass | |
| 2014/0173451 A1 | 6/2014 | Klaka | |
| 2014/0201289 A1* | 7/2014 | Wheeler | G06Q 10/107 709/204 |
| 2014/0229571 A1* | 8/2014 | Buddenbaum | G06F 16/9535 709/217 |
| 2014/0237350 A1 | 8/2014 | Ryall et al. | |
| 2014/0237387 A1 | 8/2014 | Ryall | |
| 2014/0237388 A1 | 8/2014 | Ryall | |
| 2014/0237389 A1 | 8/2014 | Ryall | |
| 2014/0237420 A1 | 8/2014 | Song et al. | |
| 2014/0281870 A1* | 9/2014 | Vogel | G06F 40/18 715/220 |
| 2014/0372539 A1* | 12/2014 | Zaveri | H04L 51/046 709/206 |
| 2015/0193521 A1* | 7/2015 | Schoeffler | G06Q 10/103 707/737 |
| 2015/0242091 A1* | 8/2015 | Lu | G06Q 10/10 715/708 |
| 2015/0249715 A1* | 9/2015 | Helvik | H04L 67/535 709/204 |
| 2015/0286636 A1* | 10/2015 | Elkhou | G06F 16/9535 707/722 |
| 2016/0162847 A1* | 6/2016 | Bastide | G06Q 50/01 705/7.21 |
| 2017/0090704 A1* | 3/2017 | Hu | H04L 51/046 |
| 2017/0139550 A1* | 5/2017 | Milvaney | G06F 40/197 |
| 2017/0177182 A1* | 6/2017 | Wong | H04L 67/535 |
| 2017/0185687 A1* | 6/2017 | Pai | H04L 51/046 |
| 2017/0220361 A1 | 8/2017 | Sharma et al. | |
| 2017/0318020 A1* | 11/2017 | Kamath | G06Q 10/101 |
| 2017/0366493 A1* | 12/2017 | Wilde | G06Q 10/101 |
| 2018/0191805 A1* | 7/2018 | Hurwitz | G06Q 10/101 |
| 2018/0284949 A1 | 10/2018 | Ryall | |
| 2018/0307382 A1 | 10/2018 | Ryall | |
| 2019/0034387 A1* | 1/2019 | Krappe | G06Q 10/101 |
| 2019/0034395 A1* | 1/2019 | Curry | H04L 51/046 |
| 2020/0068026 A1* | 2/2020 | Morkovine | G06Q 10/10 |
| 2020/0090452 A1 | 3/2020 | Higgins et al. | |
| 2020/0226118 A1* | 7/2020 | Beechuk | G06Q 10/06 |
| 2020/0364256 A1 | 11/2020 | King | |
| 2021/0124561 A1* | 4/2021 | Pezaris | G06F 8/77 |
| 2021/0160201 A1* | 5/2021 | Phan | H04L 51/04 |

OTHER PUBLICATIONS

Author Unknown, "FrontPage Templates," buytemplates.net, 4 pages, Feb. 13, 2013.
O'Reilly Media, "Front p. 2003, The Missing Manual," https://books.google.com/books?id=VtC7tdu71EwC&dg=frontpage+slip+view+option&source+gbs navlinks s, 11 pages, Aug. 18, 2005.

* cited by examiner

MULTI-SOURCE EVENT FEEDS WITH ACTIONABLE INPUTS

TECHNICAL FIELD

The present disclosure is generally directed to event feeds that may be displayed to a user, and, more specifically, to systems and methods for allowing users to modify content items to which items in an event feed relate.

BACKGROUND

Modern electronic devices facilitate a myriad of uses, both for business and personal endeavors. For example, electronic devices like personal computers, tablets, and mobile phones, are used in both business and personal contexts for creating and storing documents, writing computer code, communicating with other individuals (e.g., via email, chat services, voice and video calls, etc.), and the like. Some software applications and websites that are accessed on electronic devices provide activity feeds that notify individuals of activities or events that may interest them, such as the publication of articles, status updates from other individuals or entities, and the like.

SUMMARY

A method for displaying an event feed to a user may include, at an event feed service in communication with an issue tracking system and a collaborative document system, receiving, from an issue tracking system including a plurality of issue tickets, a notification of an event associated with an issue ticket and a reference to the issue ticket, and receiving, from a collaborative document system including a plurality of user-generated documents, a notification of an event associated with a user-generated document and including a reference to the user-generated document. The method may further include causing at least a portion of an event feed to be displayed to the user, the event feed including a first feed item including content from the issue ticket and a first actionable input object configured to cause a modification of the issue ticket in response to a first user input directed to the first actionable input object, and a second feed item including content from the user-generated document and a second actionable input object configured to cause a modification of the user-generated document in response to a second user input directed to the second actionable input object. The method may further include detecting a selection of the first actionable input object by the user and in response to detecting the selection of the first actionable input object, implementing the modification of the issue ticket via an application programming interface call to the issue tracking system. The issue ticket may include a user-generated specification of an issue in computer code of a software product, and the modification of the issue ticket may change a status of the issue.

The application programming interface may be a first application programming interface, and the method may further include detecting a selection of the second actionable input object by the user and in response to detecting the selection of the second actionable input object, implementing the modification of the user-generated document via a second application programming interface call to the collaborative document system. The content from the first user-generated document may be first content, the method may further include receiving second content from the user via the second actionable input object, and the modification of the user-generated document may include adding the second content to the user-generated document.

The method may further include receiving, from the issue tracking system, the content from the issue ticket, generating the first feed item, and sending the first feed item to a software system for display to the user in the event feed. The method may further include generating a definition of the first feed item, the definition of the first feed item including an address of the content from the issue ticket, and sending the definition of the first feed item to a software system, wherein the definition of the first feed item is configured to cause the software system to retrieve the content from the issue tracking system using the address of the content from the issue ticket.

The first actionable input object may include a button object configured to cause a status of the issue ticket to be changed when selected by the user, the second actionable input object may include a text input field configured to receive text from the user, and the modification of the user-generated document may include adding the received text to the user-generated document.

A method may include at an event feed service configured to generate an event feed for display to a user, receiving, from a first software system, a notification of an event associated with a first content item stored in association with the first software system and associated with the user, receiving, from a second software system, a notification of an event associated with a second content item stored in association with the second software system and associated with the user, and causing at least a portion of the event feed to be displayed to the user in a client application, the event feed including a first feed item including at least a portion of the first content item and a first actionable input object configured to cause a change to the first content item based on a first user input received at the first actionable input object, and a second feed item including at least a portion of the second content item and a second actionable input object configured to cause a change to the second content item based on a second user input received at the second actionable input object. The method may further include receiving the first user input at the first actionable input object, formulating an application programming interface (API) call based at least in part on the first user input, the API call configured to cause the first content item to be modified, and issuing the API call to the first software system, thereby causing the first content item to be modified based on the first user input. The first user input may include content inputted, by the user, into the first actionable input object, and the API call may include the content inputted by the user. Causing the first content item to be modified based on the first user input may include adding the content inputted by the user to the first content item.

The API call may be a first API call, and the method may further include receiving the second user input at the second actionable input object, formulating a second application programming interface (API) call based at least in part on the second user input, the second API call configured to cause the second content item to be modified, and issuing the API call to the second software system, thereby causing the second content item to be modified based on the second user input.

The portion of the event feed may be displayed to the user in a user interface associated with the second software system and the API call may be issued by the second software system to the first software system.

The first content item may be an issue ticket from an issue tracking system, the issue ticket including a user-generated specification of an issue in computer code of a software product, and the event associated with the first content item may be at least one of a change in a status of the issue ticket, an assignment of the issue ticket to the user, or an addition of user-generated content to the issue ticket.

The second content item may be a user-generated document from a collaborative document system, and the event associated with the second content item is at least one of an edit to the user-generated document or an inclusion of a username associated with the user in the user-generated document.

The method may further include, at the event feed service, in response to receiving the notification of the event associated with the first content item, generating a first specification of the first feed item, receiving, from the second software system, a second specification of the second feed item, and sending the first specification of the first feed item and the second specification of the second feed item to the client application.

A method may include, at an event feed service in communication with an issue tracking system and a collaborative document system, receiving, from a first content source, a notification of a first event associated with a first content item stored in association with the first content source and associated with the user, receiving, from a second content source, a notification of a second event associated with a second content item stored in association with the second content source and associated with the user, associating the first event and the second event with an event feed associated with the user, receiving, from a first software system, a first request for the event feed, in response to receiving the first request for the event feed, causing the event feed to be displayed in the first software system in accordance with first event feed settings, receiving, from a second software system different from the first software system, a second request for the event feed, and in response to receiving the second request for the event feed, causing the event feed to be displayed in the second software system in accordance with second event feed settings, the second event feed settings different from the first event feed settings.

The first event feed settings may cause the event feed to be displayed in the first software system in accordance with a first feed item order, and the second event feed settings may cause the event feed to be displayed in the second software system in accordance with a second feed item order that is different than the first feed item order.

The first event feed settings may cause the event feed to be displayed in the first software system in accordance with a first graphical arrangement of feed items, and the second event feed settings may cause the event feed to be displayed in the second software system in accordance with a second graphical arrangement of feed items that is different than the first graphical arrangement of feed items. The first graphical arrangement of feed items may include a single column of feed items, and the second graphical arrangement of feed items may include multiple columns of feed items.

The event feed may include a first feed item including at least a portion of the first content item and a first actionable input object configured to cause a change to the first content item based on a first user input received at the first actionable input object, and a second feed item including at least a portion of the second content item and a second actionable input object configured to cause a change to the second content item based on a second user input received at the second actionable input object.

Figure 1A:
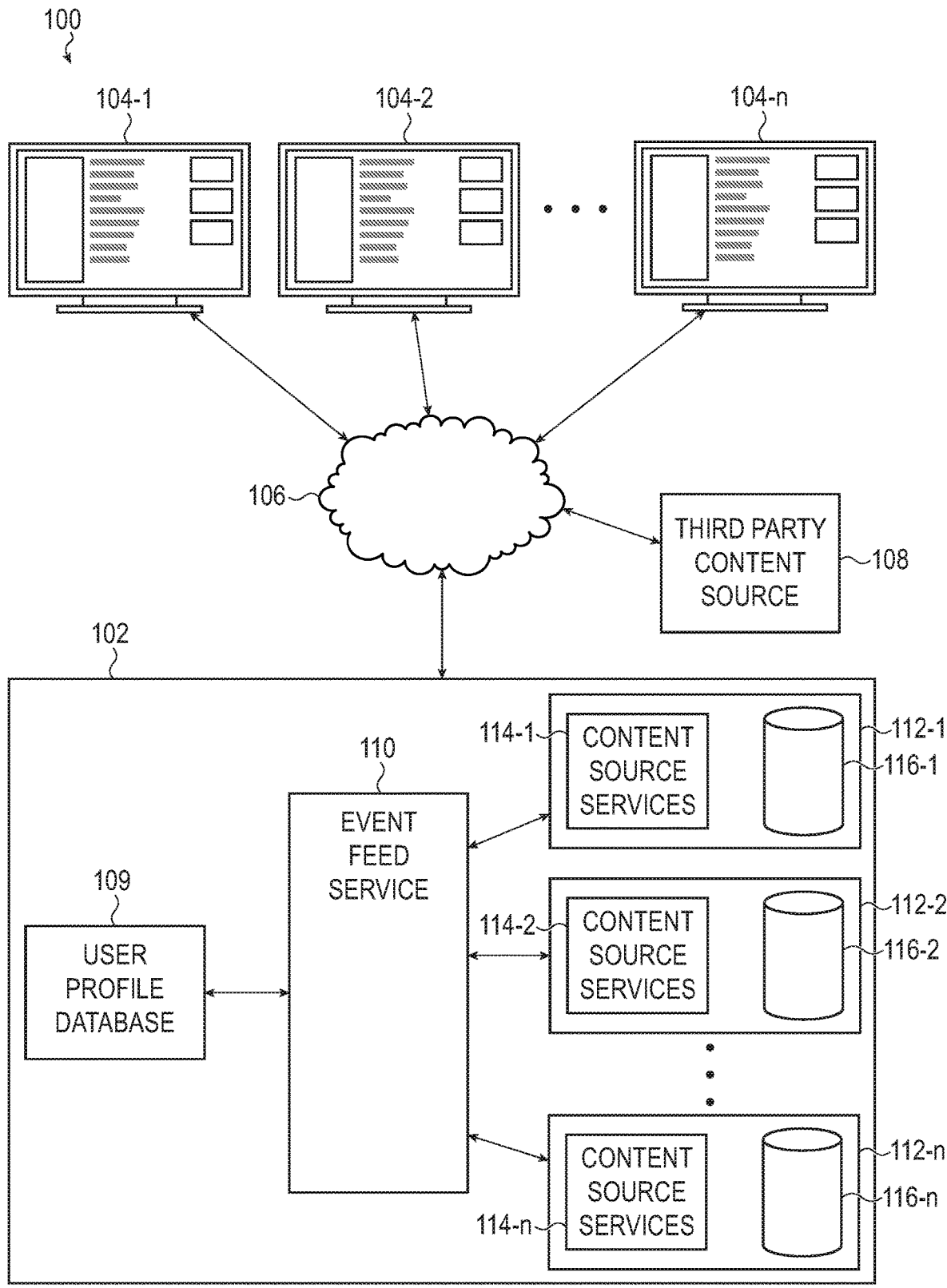
FIG. 1A depicts an example networked computer system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for providing event feeds to users across multiple software programs and computer environments, while also improving the type and extent of interactions that may be performed via event feeds. For example, while conventional feeds may present users with lists of recent content (e.g., articles, social media posts), they are generally limited in the manner in which the feeds can be accessed or viewed, and the manner in which the users can interact with the feed items. The techniques described herein facilitate the provision of event feeds in multiple different software environments, allow feed items from multiple different sources (e.g., different software applications), and allow users to interact with the feed items to change or modify the underlying content associated with the feed items. Accordingly, the event feeds described herein may be more relevant to users than conventional feeds, and provide new ways of interacting with and modifying the content items to which feed items relate.

As one particular example, conventional content or event feeds may provide information to a user about content items, such as articles, social media posts, or the like. They generally do not, however, allow the user to interact with the underlying content item in a meaningful way. Even if the feed allows the user to interact with the feed items (e.g., by saving them or clicking-through to an article), these interactions do not result in a modification or change to the underlying content item. The event feeds described herein, by contrast, provide actionable input objects that allow the user to interact with the underlying content item to which a feed item relates. For example, an event feed service may receive notifications of events relating to user-generated documents of a collaborative document system, issue tickets of an issue tracking system, or the like. The event feed service may cause feed items to be displayed to a user, and the feed items include ways for the user to modify or change the underlying content item. In the case of an issue ticket, for example, the feed item may provide an input object (e.g., a button, selectable text, etc.) that allows the user to assign or reassign the issue ticket, change a status of the issue ticket, or the like. In the case of a user-generated document, the feed item may provide an input object that allows the user to add content (e.g., text, images, etc.) to the user-generated document. Thus, the feed items provide the ability to interact with (e.g., change, modify) the underlying content item, and not merely view or engage the feed item itself.

Event feeds as described herein may be facilitated by an event feed service that receives event notifications from various different software systems, and provides event feed items to various different software systems. For example, a collaborative document system may send to the event feed service notifications of events related to user-generated content items that are generated within the collaborative document system, and an issue tracking system may send to the event feed service notifications of events related to issue tickets that are managed by the issue tracking system. Other types of content sources may also send event notifications to the event feed service, such as via an application programming interface. The event feed service may create an event feed based on the event notifications, and provide the event feed to a user across multiple different software systems. For example, if a user is working in a collaborative document system, the event feed may be displayed in the user interface associated with the collaborative document system. If the user is working in an issue tracking system, the event feed may be displayed in the user interface associated with the issue tracking system.

Further, the event feed may be different depending on the particular software application in which it is being displayed. For example, the event feed may have a different appearance or item order when it is being displayed in an issue tracking system than it would when displayed in a collaborative document system. In some cases, the ways in which a user can interact with the feed items and the underlying content items may even differ based on the software environment in which it is being displayed. For example, an event feed displayed in an issue tracking system may provide more options for modifying the issue tickets associated with feed items than would be available if the same event feed were being displayed in a collaborative document system.

The event feeds may also be user-specific. In particular, the event feed service may generate unique event feeds for multiple unique users. The particular feed items that are included in a particular user's event feed may be based on various factors, including but not limited to the user's content interaction histories, the user's feed preferences and/or subscriptions, a role of the user in an organization, an author or supervisor status of the user with respect to content items, or the like. Accordingly, the event feed for each user may be unique to that user, and may further be customized for each user and based on the software application or user interface environment in which the event feed is being displayed. Event feeds may also be customizable by the user. For example, a user can select preferences for their own event feeds. Example feed preferences may include feed appearance parameters (e.g., size, location), feed item ordering parameters (e.g., what order feed items are shown in, based on their associated tasks, content item type, associated software applications, or the like), feed item content filters (e.g., to filter or rank feed items based on their sentiment), or the like. In some cases, event feed parameters or preferences for multiple users (e.g., all or a subset of users across an organization) may be selected by an administrator, such as to promote or prioritize feed items with a more positive sentiment over those with negative sentiment, or to promote or prioritize feed items from certain individuals or related to certain tasks or projects.

These and other features of the event feed service are described herein. While certain example software environments are used to illustrate the features of the event feed service, these are provided for example purposes only. Indeed, the event feed services described herein may accept event notifications from numerous different types of software applications and/or services, including but not limited to messaging applications (e.g., instant message applications, email applications, group-messaging applications, etc.), wiki applications, sales management applications, project management applications, source code control applications (e.g., for managing, creating, and/or editing source code for computer programs, websites, etc.), human resources applications, or the like.

FIG. 1A depicts an example networked computer system 100 (or simply "system 100") in which the techniques described herein may be employed. The system 100 includes an application services system 102, third party content sources 108, and client devices 104 (104-1, . . . , 104-*n*) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The application services system 102 may be or may include one or more servers, content stores (e.g., databases), communications systems, data structures, programs, or other components, systems, or subsystems that provide services described herein, including event feed services. The application services system 102 may include an event feed service 110, one or more content sources 112 (e.g., 112-1, . . . , 112-*n*), and a user profile database 109. The one or more content sources 112 provide content and content services to users of the system 100, as described herein. The event feed service 110 may generate event feeds, and may send and receive information relating to the event feeds among the content sources and client devices of the system 100.

The content sources 112 may include content source services 114 (e.g., 114-1, . . . , 114-*n*) and data stores 116 (e.g., 116-1, . . . , 116-*n*). Content source services 114 may facilitate the creation, deletion, management, editing, serving, and/or other services related to the content and/or content items associated with that content source and stored in the data store 116. Data stores 116 may be databases or other data storage resources that store content items and/or other data related to a content source 112.

In some cases, a first content source 112-1 may be a collaborative document system. The collaborative document system may allow users (e.g., via clients 104) to create, modify, view, and/or otherwise interact with documents, which may be stored in the data store 116-1. Documents may be user-generated, and may include content such as text, images, graphics, tables, or the like. Documents may be linked or otherwise related to one another in a document hierarchy. Documents (e.g., user-generated documents) may be stored in the data store 116-1 as files, data structures, or the like. The content source services 114-1 of the collaborative document system may facilitate content services related to the documents, including causing user interfaces of the collaborative document system to be displayed to a user on a client 104, receiving user inputs relating to the creation and/or modification of documents, and the like. The content source services 114-1 may also send to the event feed service 110 notifications of events relating to user-generated documents stored in the data store 116-1, as described herein.

A second content source 112-2 may be an issue tracking system that tracks issues via issue tickets, which may be stored in the data store 116-2. Issue tickets may include content, such as a user-generated description of an issue, issue status (e.g., closed, open, awaiting review), user assignments, issue ticket urgency, issue ticket age, and the like. In some cases, issue tickets may include user-generated specifications of issues in computer code of software products.

Issue tickets may be stored in the data store 116-2 as files, data structures, or the like. The content source services 114-2 of the issue tracking system may facilitate content services related to the issue tickets, including causing user interfaces of the issue tracking system to be displayed to a user on a client 104, receiving user inputs relating to the creation and/or modification of issue tickets (e.g., changing status, receiving content related to the issue and/or issue resolution, etc.), changes to issue status, changes to user assignments, and the like. The content source services 114-2 may also send to the event feed service 110 notifications of events relating to the issue tickets stored in the data store 116-2, as described herein.

One or more third party content sources 108 may also interface with the event feed service 110 to provide notifications of events for inclusion into event feeds. For example, as described herein, third party content sources 108 may send to the event feed service 110, via an application programming interface, a notification of an event, and content associated with the event. The event feed service 110 may incorporate the content into an event feed for an intended user. Similarly, the event feed service 110 may send information to the third party content source 108, via an application programming interface, based on user interactions with feed items related to the third party content source.

The event feed service 110 communicates with the content sources 112 to receive notifications of events (and optionally content associated with the events). The notifications of events may be provided to the event feed service 110 according to a push protocol in which the content sources 112 send the notifications according to their own schedule (e.g., in response to an event occurring and generating a notification), or according to a fetch protocol in which the event feed service 110 requests notifications of events from the content sources.

The event feed service 110 may generate event feed items (or simply feed items) and event feeds for users based on the received notifications, and send and/or provide the event feeds to client devices 104. For example, the event feed service 110 may receive a notification of a modification to a document in a collaborative document service (e.g., the content source 112-1), and generate a feed item based on the notification. The feed item may include information about the document, a portion of the document's content, and one or more actionable input objects that a user can interact with to cause a change or modification to the document. The feed item may be displayed to a user (e.g., on a client 104) in a manner that is customized based on factors such as the identity of the user, the software application in which the event feed is displayed, feed presentation preferences of the user, or the like. The event feed service 110 may generate feed items and send the feed items to the client devices 104 for display in an event feed. In some cases, the event feed service 110 generates definitions of feed items, where the definitions include an address of the underlying content item to which the feed item relates. The definition, when sent to a client device 104, may cause the client device 104 to retrieve the content item or information from the content item.

The event feed service 110 may also receive, from client devices 104, information about interactions with the feed items. For example, if a user interacts with an actionable input object of a feed item, information about that interaction may be sent from a client device 104 to the event feed service 110, which may then communicate that information to the relevant content source 112. As one nonlimiting example, if a user interacts with a feed item relating to an issue ticket and assigns the issue ticket to another user, the event feed service 110 may receive the information (e.g., an identifier of the issue ticket and an identifier of the new user), and provide that information to the event feed service 110 so that the underlying content item (e.g., the issue ticket) can be modified appropriately.

The event feed service 110 may communicate with a user profile database 109 in order to generate individualized feed items and event feeds for unique users. The user profile database 109 may store and maintain user profiles about users of the system 100. User profiles may include numerous types of information about the users of the system, including but not limited to names, departments, job titles, roles, content with which they are associated (e.g., documents, issue tickets, messages, etc.), relative position in a hierarchy in an organization or entity, or the like. The event feed service 110 may use the information in the user-profile database to determine what events should be included in a user's event feed, what types of actionable input objects should be included in feed items (e.g., what types of modifications can be made by that particular user to the underlying content item to which a feed item relates), how an event feed should be displayed to the user, and the like.

While collaborative document systems and issue tracking systems are used as example content sources, these are merely examples of content sources that may be used with event feed services described herein. Other types of content sources 112 include, without limitation, messaging applications (e.g., instant message applications, email applications, group-messaging applications, etc.), wiki applications, sales management applications, project management applications, source code control applications (e.g., for managing, creating, and/or editing source code for computer programs, websites, etc.), human resources applications, or the like.

Figure 1B:
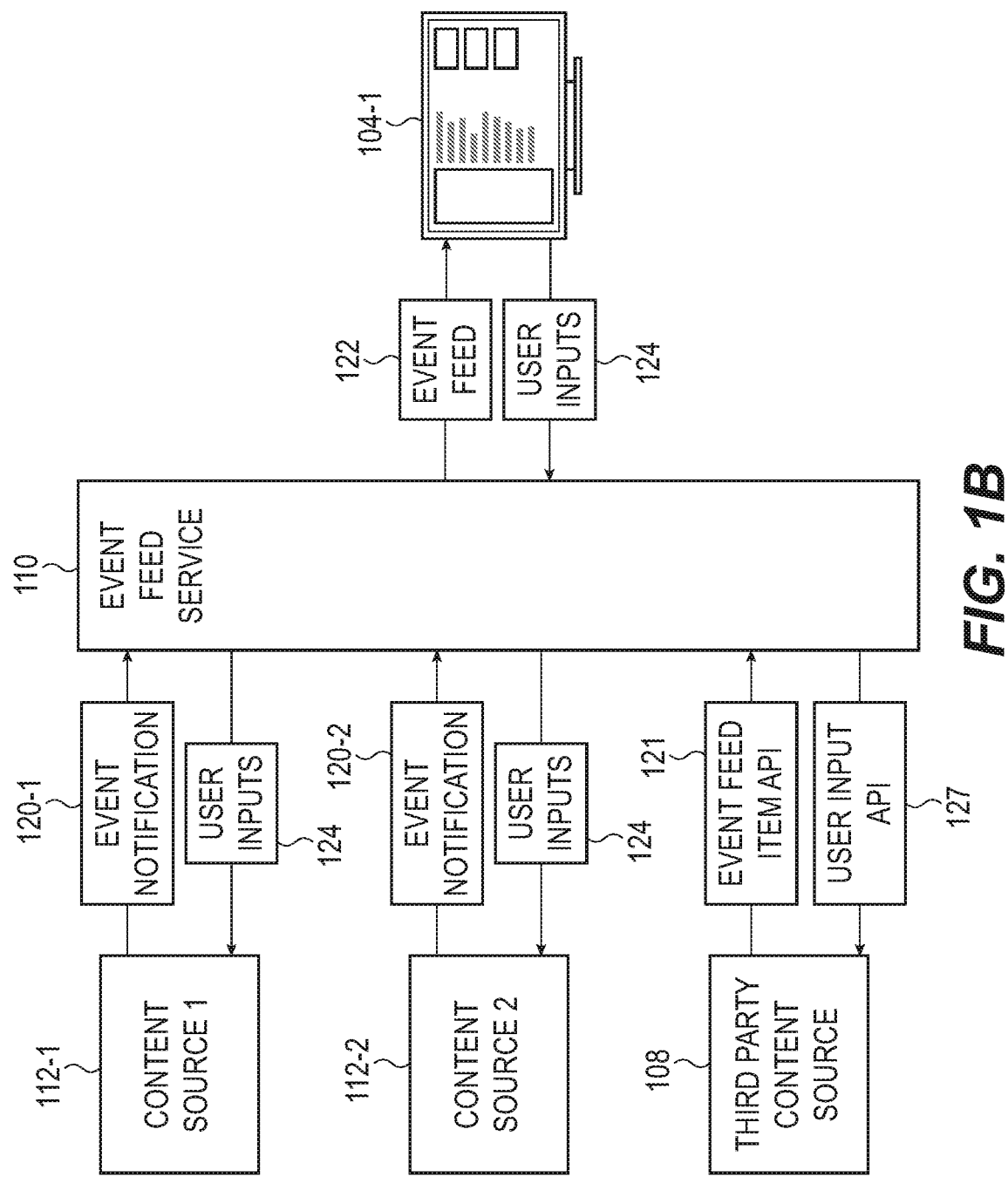
FIG. 1B depicts an example operation of a feed service that generates event feeds and facilitates user interactions with content items about which feed items in the event feed relate.

FIG. 1B illustrates how the event feed service 110 facilitates the type of enhanced functionality in event feeds that is described herein. More particularly, FIG. 1B demonstrates how the event feed service 110 not only generates event feeds for users, but also allows the user to interact with the event feeds to modify the content underlying the feed items. For example, multiple content sources 112 may send notifications of events (notifications 120) associated with the content sources to the event feed service 110. The notifications 120 may be triggered by an event occurring with respect to a content item associated with the content sources. For example, a change in a status of an issue ticket may cause an event notification 120 to be sent to the event feed service 110. Other examples of events that trigger an event notification 120 include, without limitation, an edit to the content of a user-generated document, a request for an approval in respect of a content item, an upcoming deadline or due date for an action or content item, or the like. Whether an event triggers a notification 120 (or whether a notification causes a feed item to be generated) may be determined at least in part based on user interaction histories of a user. For example, if an interaction history of a user indicates that the user frequently reviews edits made to content items associated with a particular project, the content sources may send notifications related to content items associated with that project (and/or the event feed service may generate feed items for the user in response to receiving notifications relating that project).

The notifications 120 may include information about the event, such as a textual description of the event, a code indicating the event, or the like. The notifications 120 may also include information related to the content item associated with the event. For example, information related to the content item may include an identifier of the content item (e.g., an address, a URL, a unique identifier of the content item in the content source 112, a file name, etc.), content from the content item (e.g., a portion of textual, graphical, or other content from the content item), metadata or attributes associated with the content item (e.g., an author of the content item, a title of the content item, a type or category of the content item), user inputs associated with the content item (e.g., user inputs that may be included as actionable input objects in event feed items), or the like. In some cases, an event notification 120 may include a complete specification of a feed item associated with an event.

The notifications 120 may also include information that may be used to prioritize or rank feed items in a user's feed. For example, notifications 120 may include a date on which an action item is due or is requested to be completed. A feed item corresponding to that notification may be ranked and/or prioritized in a user's event feed based on that date. For example, if the date is not imminent, the feed item may be positioned lower in the event feed. If the date is imminent, the feed item may be positioned higher in the event feed. In some cases, if a due date or requested-by date is imminent, it may re-appear in the event feed so that the user encounters the feed item multiple times as they scroll through their event feed (or as the event feed otherwise advances or displays new feed items). The imminency of a due date or requested—by date may be based in part on a timeline or duration associated with the task. For example, the task is one that is generally accomplished quickly (e.g., approving a closure of an issue ticket, assigning an issue ticket to a user), a feed item associated with that task may be considered imminent when the due date or request-by date is within one day (or less, such as within 6 hours). If the task is one that generally takes a longer time to complete (e.g., reviewing user-generated content or edits to a document, reviewing changes to a codebase), the feed item associated with that task may be considered imminent when the due date or request-by date is within one week (or any other suitable time line). The event feed service 110 may store data regarding the estimated time to complete certain tasks that may be the subject of feed items, and may use the estimated times along with the date information included in a notification 120 to determine how to rank and/or display feed items in an event feed.

Once a due date or request-by date has passed, the feed item for that content item may be persistently displayed in the user's event feed, such as at the top of the list in the feed. In some cases, past-due feed items cannot be scrolled off of the feed or otherwise removed from display until they are completed. As another example, past-due feed items may be muted or snoozed for a period of time, but they may continue to be displayed to the user at intervals until they are completed.

A notification 120 may also include an urgency indicator. An urgency indicator may be user-selectable, or may be selected based on a type of event that triggered the notification. Urgency indicators may indicate a relative urgency of a task or notification, without necessarily including a due date or requested-by date. Urgency indicators may include a limited set of options. For example, the urgency of an event may be selected from high urgency, normal urgency, or low urgency. As another example, urgency may be scaled from 1-10 (with 10 corresponding to the highest urgency). The event feed service 110 may use the urgency indicator to determine how, where, and/or how frequently the associated feed item is displayed to the user. For example, high urgency feed items may be shown to a user more frequently or may be shown higher in the feed order than normal or low urgency items. In some cases, the urgency of a feed item may be determined by the event feed service 110 (e.g., without a user-specified urgency) based on factors such as the software application to which the feed item relates, whether the feed item includes an actionable input object or otherwise requires or prompts the user to take some action, an urgency of a project or task to which a feed item relates, or the like.

Figure 2A:
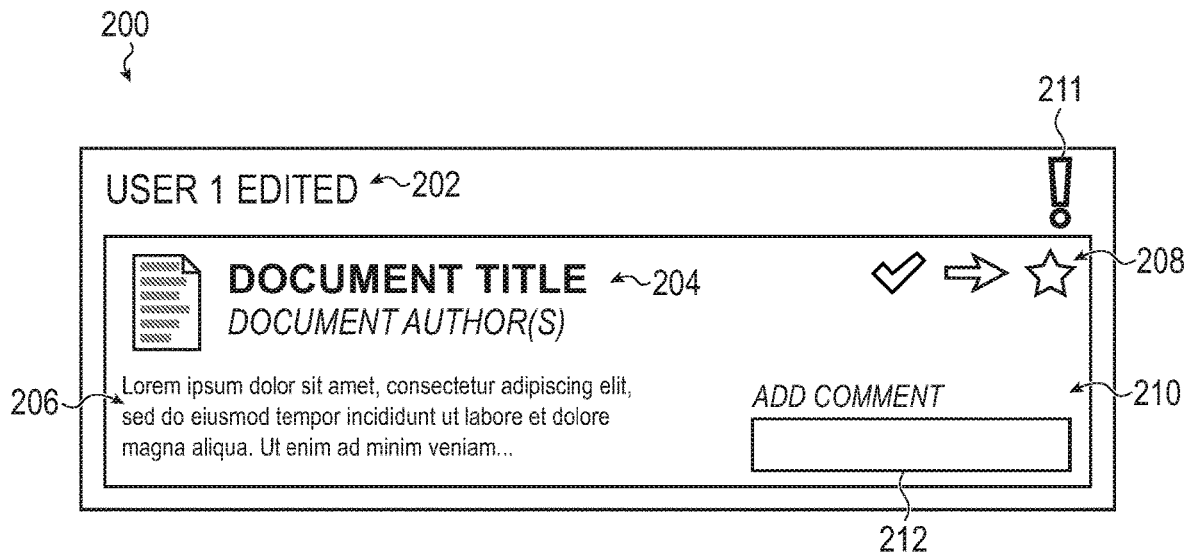
FIGS. 2A-2B depict example feed items for an event feed as described herein.
Figure 2B:
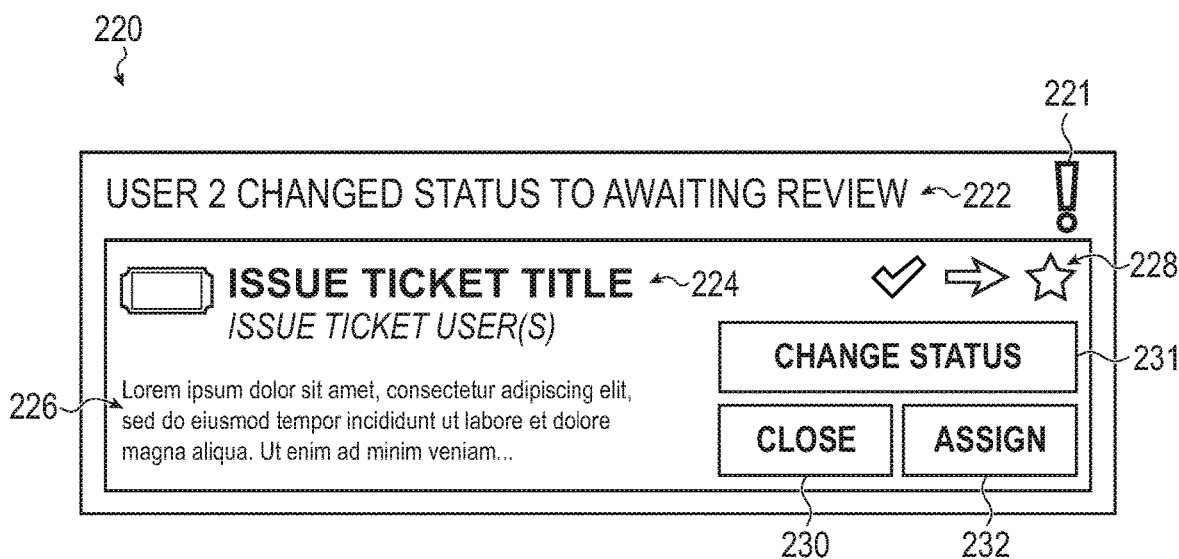

The appearance of feed items may also dependent in part on the urgency or imminence of the feed item. For example, feed items with a high urgency or imminence may be shown in a different color as other feed items, or have a distinctive border or other graphical component that visually differentiates the more urgent or imminent feed items from other feed items. FIGS. 2A and 2B, for example, illustrate example feed items with indicia of urgency, which may be displayed on feed items that have been specified as having a high urgency or imminence (e.g., by a user, or automatically by the event feed service 110).

Notifications 120 may be provided from multiple content sources 112, where the content sources 112 may be associated with different types of content and/or different types of content services. In some cases, the content sources 112 are associated with different software systems. As described above, the content sources 112 may be part of the same application services system 102 as the event feed service 110. In such cases, the content sources 112 and the event feed service 110 may both be capable of accessing the same content items. Accordingly, the notifications 120 may include references to content items in place of actual content from the content items. This may reduce the size and complexity of the notifications 120 and may result in greater efficiencies in the application services system 102. The notifications 120 may be formulated as application programming interface (API) calls.

Third party content sources 108 may also provide information to the event feed service 110 to be included in an event feed. Such information from third party content sources 108 may be formulated as API calls, and may be referred to as event feed item API calls 121. The event feed item API calls 121 may include the same or similar information as the notifications 120, as described above. In some cases, the API calls 121 also include a specification for the feed item that is to be generated based on the API call 121. The specification may specify parameters such as appearance, graphical layout, icons or other graphical objects to be displayed, textual content to be included in the feed item, and the like.

The event feed service 110 receives the event notifications 120 from content sources 112 and the API calls 121 from third-party sources and generates feed items based on the notifications. The feed items may be generated based on the information in the event notifications 120 and the API calls 121, as well as content retrieved from other sources. For example, the event feed service 110 may receive a notification 120 that includes a reference to a content item (e.g., an address or file name), and the event feed service 110 may communicate with a data store (e.g., a data store 116) to retrieve the content item or information from the content item for inclusion into a feed item.

Upon request from a client device 104-1 (e.g., from an application executed on the client device 104-1), the event feed service 110 may generate an event feed and provide the event feed to the client device 104-1. The event feed may be generated specifically for the user associated with the client device 104-1. For example, the event feed may include feed items that are relevant to the user. Relevancy to a user may be based on various factors, such as whether the user is explicitly identified in the feed item, whether the feed item relates to a content item for which the user is an author or contributor, whether the feed item relates to an organizational role of the user, whether the user has interacted with similar feed items in the past, whether the user's input is required by the content item, or the like.

The event feed provided by the event feed service 110 to the client device 104-1 may also be tailored for the particular application environment in which the user is operating. For example, the particular application environment in which the user is operating may define which particular feed items are included in the event feed, the order of feed items in the event feed, the appearance (e.g., graphical presentation) of the event feed, or the like. Accordingly, the event feed service 110 generates and provides event feeds that are customized to individual users and to the application environment in which the event feed is presented. Once the event feed is generated it may be sent to the client device 104-1 (e.g., event feed 122 in FIG. 1B) for display to the user. The event feed may be provided to the client device 104-1 according to a push protocol in which the event feed service 110 sends the event feed (or feed items) according to a schedule (e.g., in response to a feed item being generated), or according to a fetch protocol in which the client device requests the event feed or feed items from the event feed service 110 (e.g., according to an update cycle or schedule, when the user instantiates a different software application, or the like).

As noted above, feed items described herein include actionable input objects that are configured to cause a change to an underlying content item based on a user input received at the actionable input object. For example, as described herein, an actionable input object may be configured to change a status of an issue ticket or add or change content of a user-generated document. In such cases, such user inputs 124 are received at the client device 104-1 and sent to the event feed service 110. The event feed service 110 then sends the user inputs 124 (or information from the user inputs 124) to the content sources 112. In some cases, the communications from the event feed service 110 to the content sources 112 include commands or requests to modify a content item of the content source 112 in a manner requested by the user input. For example, if the user uses an actionable input object to change a status of an issue ticket, event feed service 110 may send a command or request to the content source 112-2 to change the status of the issue ticket as prescribed by the user input 124 (as illustrated in FIG. 1B by the user inputs 124 from the event feed service 110 to the content sources 112). The event feed service 110 may forward the user inputs 124 received from the client device 104-1 directly to the content sources, or it may modify them or send other information that is configured to execute the content modification requested by the user inputs.

The user inputs 124 may be formulated as API calls to the content sources 112. Further, in cases where a user interacts with an actionable input object of a feed item from a third party content source, the event feed service 110 may send a user input API call 127 to the third party content source.

While FIG. 1B illustrates the event feed service 110 generating feed items and event feeds for a single client device 104-1 (and/or a single user), it will be understood that the event feed service 110 may provide the same services to multiple client devices 104 and/or multiple individual users.

FIGS. 2A-2B illustrate nonlimiting examples of feed items that include actionable input objects for modifying content items to which the feed items relate. FIG. 2A illustrates an example feed item 200 that pertains to a document, such as a user-generated document that may be stored in association with a collaborative document system. The collaborative document system may be an example of a content source 112, as described above (e.g., the content source 112-1).

The feed item 200 may include a feed item title 202. The feed item title 202 may include information about the feed item, such as a description or other indication of the event that caused the feed item to be generated (e.g., that caused a notification of the event to be provided to the event feed service 110). In the example of FIG. 2A, the feed item title 202 states that a document was edited, and the identity of the user who edited the document (e.g., a username of the user who edited the document). Thus, the viewer of the feed item 200 can quickly and easily determine the event that initiated the feed item. In some cases, the feed item title 202 includes more, less, or different information, such as a title or other identifier of the document, a timestamp of the event, or the like.

The feed item 200 may also include a reference 204 to the content item to which the feed item 200 relates. For example, the reference 204 may include a title of the content item, an author of the content item, a size of the content item, a subject of the content item, or any other suitable information. The information included in the reference 204 may be taken from metadata associated with the content item, or from the content item itself.

The feed item 200 may also include a content preview 206. The content preview 206 may include a portion of content extracted from the content item. In some cases, the content of the content preview 206 is selected based on the event that caused the feed item to be generated. For example, the content in the content preview 206 may include part of the content item that was edited (e.g., the edit(s) that initiated the creation of the feed item 200). In some cases, a user selection (e.g., a click, touch, tap, etc.) on the content preview 206, the reference 204, and/or the feed item title 202 may cause the content item to be displayed to the user. In some cases, this may include initiating a different software application (or graphical interface thereof) to display the content item to the user. For example, if a first graphical user interface of a first software application is being displayed to a user, and the feed item is displayed in an event feed in the first graphical user interface, selection of the feed item (e.g., the content preview, reference, title, etc.) may cause a second graphical interface of a second software application to be displayed to the user. As one specific example, if a user is viewing an event feed in a graphical user interface of an issue tracking system, selecting a feed item associated with a user-generated document may cause a graphical user interface of a collaborative document system to be displayed to the user (optionally entirely in place of the graphical user interface of the issue tracking system).

The feed item 200 may also include feed item controls 208. Feed item controls may be selectable input objects that allow a user to interact with the feed item 200. For example, the feed item controls 208 shown in FIG. 2A include a star, an arrow, and a check mark. A user selection of the star may indicate that the user has "flagged" the feed item. Flagging the feed item may associate the feed item with a list of feed items for follow-up, and may result in the feed item being displayed in a different position in an event feed, or in a different event feed, or re-displayed in the event feed at another time. Flagged feed items may also or alternatively appear in a separate list of feed items or tasks. For example, flagged feed items may appear in a to-do list or "action" list for that user, which may be displayed separately from the event feed (or otherwise accessible in a manner different from the event feed).

A user selection of the arrow may allow a user to forward the feed item 200 to another user's attention (e.g., to "share" the feed item 200). Such action may cause the feed item 200 to be displayed in the other user's event feed (or otherwise sent to the other user's attention), optionally with an indication of who sent the feed item 200. A user selection of the check mark may mark the feed item 200 as having been read or acknowledged. Such action may cause the feed item 200 to be removed from the user's event feed, muted, or prevented from being displayed in the event feed again.

The feed item 200 also includes an actionable input object 210. The actionable input object 210 facilitates user interaction with the underlying content item to which the feed item 200 relates. For example, as described above, the feed item 200 may relate to a user-generated document in a collaborative document system. More particularly, the feed item 200 may have been generated in response to an action or event that occurred with respect to the user-generated document (e.g., that it was edited by "user 1"). Accordingly, the actionable input object 210 may allow the user to interact with (e.g., modify) the underlying user-generated document.

As described herein, the particular interaction and/or actions that are enabled by the actionable input object of a feed item may be based on the underlying content item. In particular, different types of underlying content items may have different actions associated therewith. Accordingly, the actionable input object (and more particularly the action that is performed in response to a user interaction with or selection of the actionable input object) that is included in a feed item is configured to modify the underlying content item in a manner that is consistent with the underlying content item. Thus, for example, actionable input objects for a user-generated document may allow users to add, edit, remove, or otherwise change text (or other content) of the user-generated document to which the feed item relates. Actionable input objects for an issue ticket may allow users to change a status of the issue ticket, assign or reassign the issue ticket, forward the issue ticket, change an issue ticket urgency, or the like. Actionable input objects for a task may allow users to change the content of the task, change the due date of a task, change a status of the task (e.g., mark it complete, incomplete, pending, etc.), or the like. In the example of FIG. 2A, the actionable input object 210 is configured to add text to the user-generated document to which the feed item 200 relates. For example, the actionable input object 210 includes a text input field 212. A user can input text into the text input field 212 in the feed item 200, thereby causing that text to be added to the user-generated document, as described with respect to FIG. 3A. In FIG. 2A, the text is to be added as a comment to the user-generated document, though this is merely one example, and text may be added to other portions of the document and/or for other purposes.

As noted above, content items may be associated with a particular set of actionable input objects that are relevant to that type of content item. From this set, one or more actionable input objects may be selected for inclusion in a feed item. The selection of which actionable input object(s) to include for a given content item may be based on various factors. In one example, the actionable input object may be selected based on an attribute of the user for whom the feed item is generated. For example, if a feed item is being generated for a user who is an author or administrator of a content item, the actionable input object may allow for addition or deletion of text, while a feed item for a non-author or non-administrator may only allow the addition of text. Other example attributes of a user that may be used to select an actionable input object may include a user's role in an organization, a content interaction history of the user, an authorization or administration level with respect to a content item, a job title of the user, or the like.

In another example, an actionable input object may be selected based on the event that initiated the feed item. For example, if a feed item is generated in response to new content being added to a content item, an actionable input object that allows a user to remove, edit, or add to the new content may be selected. If a feed item is generated in response to a change in a status of the content item, an actionable input object that allows a user to approve or reject the change in status may be selected.

Other example factors that may be used to determine what actionable input object to include in a feed item for a given content item include an attribute of a user who caused the event (e.g., the identity of a user who edited a document to trigger a feed item), an attribute of the event that triggered the feed item (e.g., if the event was a content edit, a change in status, a change in assignment, etc.), a next task associated with the content item (e.g., if the next task in a workflow associated with the content item requires a certain type of input), or the like.

For any given feed item, more than one actionable input object may be included in the feed item. In such cases, each actionable input object may be selected according to factors as described above. Further, in some cases, a content item or type of content item may be associated with only a single type of actionable input object, in which case an associated feed item will include that type of actionable input object or no actionable input object.

As described herein, feed items may be associated with an urgency, due date, imminence, or the like, which may be used to determine how, when, and how frequently (among other possible factors) to display feed items to a user. In some cases, a feed item may include an indicia of urgency (such as the indicium 211) based on the urgency, imminence of an upcoming due date, or the like. As shown, the indicium 211 is a distinctive exclamation mark, but this is merely one example graphical feature that may be used to distinguish a feed item of high urgency or imminence. In other examples, a different graphic may be used (e.g., a star, an animated icon, etc.). As another example, the feed item may be displayed with a distinctive border (e.g., bold, flashing, different color, etc.). As yet another example, the feed item or a portion thereof may have a color, pattern, background, size, shape, location, or other graphical aspect that is different from feed items having a lower urgency or imminence.

FIG. 2B illustrates an example feed item 220 that pertains to an issue ticket that may be stored in association with an issue tracking system. The issue tracking system may be an example of a content source 112, as described above (e.g., the content source 112-2).

The feed item 220 may include a feed item title 222. The feed item title 222 may include information about the feed item, such as a description or other indication of the event that caused the feed item to be generated (e.g., that caused a notification of the event to be provided to the event feed service 110). In the example of FIG. 2B, the feed item title 222 states that a status of the issue ticket was changed, and the status to which it was changed (e.g., awaiting review). Thus, the viewer of the feed item 220 can quickly and easily determine the event that initiated the feed item. In some cases, the feed item title 222 includes more, less, or different information, such as a title or other identifier of the issue ticket, a timestamp of the event, a previous status of the issue ticket, or the like.

The feed item 220 may also include a reference 224 to the content item to which the feed item 220 relates. For example, the reference 224 may include a title of the issue ticket, users associated with and/or assigned to the issue ticket, an author of the issue ticket, a software (or other) product to which the issue ticket relates, or any other suitable information. The information included in the reference 224 may be taken from metadata associated with the content item, or from the content item itself.

The feed item 220 may also include a content preview 226. The content preview 226 may include a portion of content extracted from the content item. In one example, the content preview 226 may include a portion of a user-generated specification of an issue in computer code of a software product to which the issue ticket relates. In some cases, the content of the content preview 226 is selected based on the event that caused the feed item to be generated. For example, the content in the content preview 226 may include an update to the issue ticket that accompanied the change in status of the issue ticket.

In some cases, a user selection (e.g., a click, touch, tap, etc.) on the content preview 226, the reference 224, and/or the feed item title 222 may cause the content item to be displayed to the user. In some cases, this may include initiating a different software application (or graphical interface thereof) to display the content item to the user. For example, if a first graphical user interface of a first software application is being displayed to a user, and the feed item is displayed in an event feed in the first graphical user interface, selection of the feed item (e.g., the content preview, reference, title, etc.) may cause a second graphical interface of a second software application to be displayed to the user. As one specific example if a user is viewing an event feed in a graphical user interface of a collaborative document system, selecting a feed item associated with an issue ticket may cause a graphical user interface of an issue tracking system to be displayed to the user (optionally entirely in place of the graphical user interface of the collaborative document system).

The feed item 220 may also include feed item controls 228. Feed item controls may be selectable input objects that allow a user to interact with the feed item 220. Feed item controls 228 may be the same as the feed item controls 208 described with respect to FIG. 2A, and may operate the same in the context of the feed item 220.

The feed item 220 also includes actionable input objects 230, 231, 232 (e.g., button objects). As noted above, the actionable input objects facilitate user interaction with the underlying content item to which the feed item 220 relates. For example, as noted above, the feed item 220 may relate to an issue ticket of an issue tracking system. More particularly, the feed item 220 may have been generated in response to an action or event that occurred with respect to the issue ticket (e.g., that "user 2" changed the status of the issue ticket to "awaiting review"). Accordingly, the actionable input objects 230, 232 may allow the user to interact with (e.g., modify) the underlying issue ticket.

As noted above, the particular interaction and/or actions that are enabled by the actionable input object of a feed item may be based on the underlying content item. FIG. 2A illustrates an example actionable input object for a user-generated document, while FIG. 2B illustrates example actionable input objects for interacting with (e.g., modifying) an issue ticket to which the feed item 220 relates. Issue tickets may be associated with a workflow and a target outcome. The target outcome for an issue ticket may be closure of the issue ticket. An issue ticket may be considered closed when the issue associate with the issue ticket has been resolved (e.g., a target result has been achieved, it has been resolved to the satisfaction of an issue author or supervisor, or any other suitable resolution has been reached). The actionable input object 230 allows the viewer of the feed item 220 to close the associated issue ticket, ultimately modifying the underlying issue ticket (e.g., to change its status from open to closed). The actionable input object 231 allows the viewer of the feed item 220 to change a status of the issue ticket. The feed item 220 also includes an actionable input object 232 that assigns or reassigns the issue ticket to another user or individual.

In some cases, the actionable input objects 230, 232 may only be displayed if certain conditions are satisfied. For example, in some cases an actionable input object to close an issue ticket is displayed only if a current status of the issue ticket is one from which the issue ticket is permitted to be closed. As another example, an actionable input object to close an issue ticket or assign an issue ticket may be displayed only if the individual for whom the feed item 220 is generated has authorization to perform that action.

The feed item 220 also includes an optional indicia of urgency (such as the indicium 221) based on the urgency, imminence of an upcoming due date, or the like. As shown, the indicium 221 is a distinctive exclamation mark, but this is merely one example graphical feature that may be used to distinguish a feed item of high urgency or imminence. In other examples, a different graphic may be used (e.g., a star, animated icon, etc.). As another example, the feed item may be displayed with a distinctive border (e.g., bold, flashing, different color, etc.). As yet another example, the feed item or a portion thereof may have a color, pattern, background, size, shape, location, or other graphical aspect that is different from feed items having a lower urgency or imminence.

FIGS. 2A-2B illustrate several examples of actionable input objects and associated functions that may be included in a feed item. Other example actionable input objects may include button objects that change a status of an underlying content item, actionable input objects that allow a user to accept or reject a proposed change or modification to a content item, and actionable input objects that change metadata of a content item. Other actionable input objects and associated functions (e.g., modifications to underlying content items) are also contemplated.

Figure 3A:
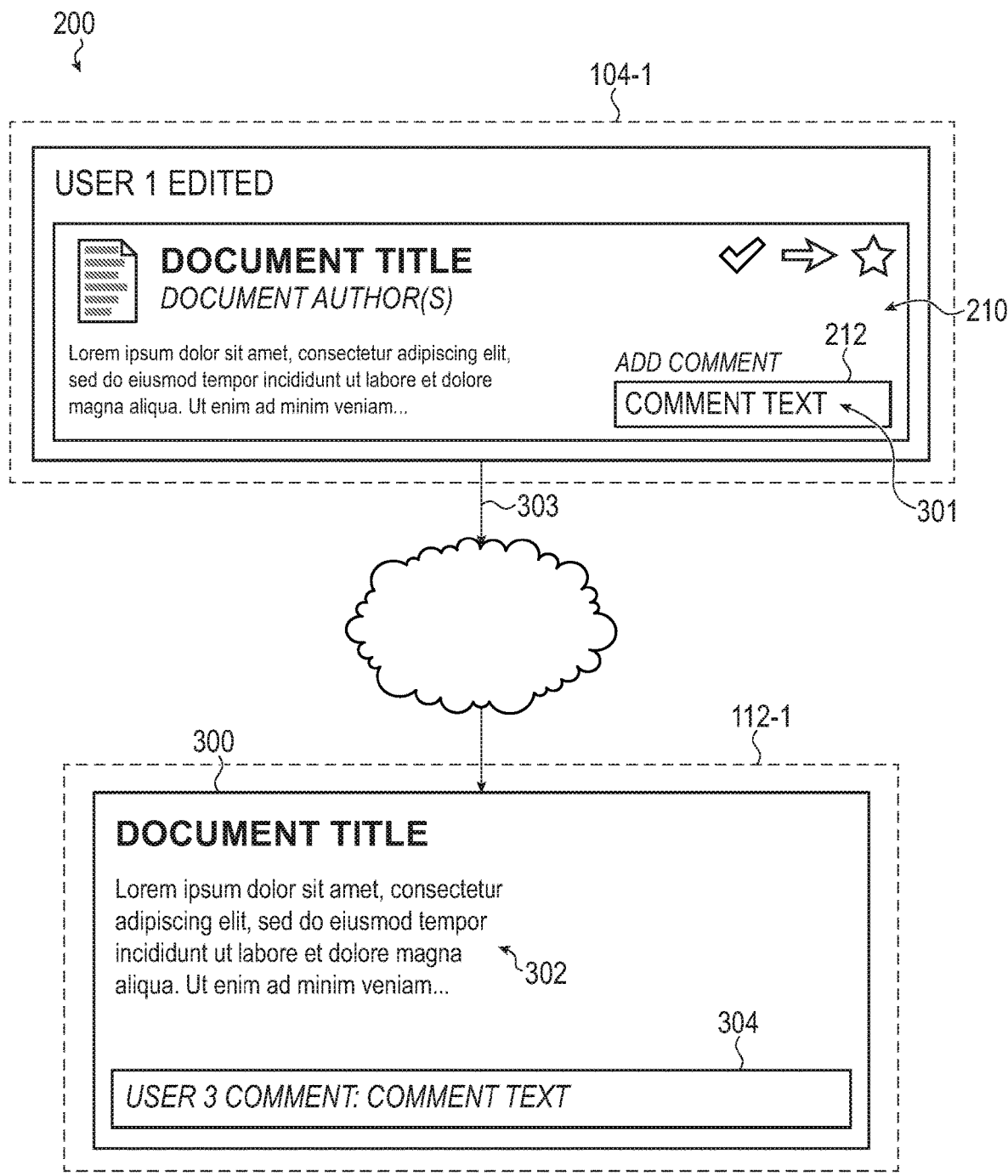
FIGS. 3A-3B depict examples of content items being modified as a result of user interactions with actionable input objects in event feed items.

FIG. 3A illustrates how an example user interaction with the actionable input object 210 of the feed item 200 modifies the underlying content item (e.g., a user-generated document 300 of a collaborative document system). For example, the feed item 200 having the actionable input object 210 is displayed to a user in an event feed (e.g., on the client device 104-1). The feed item 200 relates to an event that occurred with respect to a content item. In this example, the content item is a user-generated document 300, and the event is an edit of the user-generated document 300.

The user selects the actionable input object 210 in a manner that is consistent with the input accepted by the actionable input object. In the case of the actionable input object 210, user selection of the actionable input object includes receiving input text 301 in the text input field 212. In other example actionable input objects, a user selection may include selecting (e.g., clicking, pressing, etc.) a virtual button.

In response to the selection of the actionable input object 210 (e.g., the inputting of text into the text input field 212), an application programming interface (API) call 303 may be issued to the content source 112-1 associated with the underlying content item. The API call 303 may be formulated by the client device 104-1 and issued from the client device 104-1 to the content source 112-1 (e.g., a collaborative document system in which the user-generated document 300 is stored). In another example, the API call 303 may be formulated by and sent to the content source 112-1 from an event feed service 110 (FIG. 1B). For example, the user selection of the actionable input object 210 (including the text 301) may be sent from the client device 104-1 to the event feed service 110, and the event feed service 110 may formulate and send the API call 303 to the content source 112-1. The API call 303 may be include information from the user selection of and/or interaction with the actionable input object 210. For example, the API call 303 may include the input text 301 that was inputted by the user into the text input field 212.

In response to the API call 303, the content source 112-1 modifies the underlying content item as indicated by the API call 303. For example, the API call 303 includes the input text 301 that was provided by the user, along with any associated instructions for incorporating the input text 301 into the user-generated document 300 (e.g., whether the text is a comment, where the text is to be added to the document 300, etc.). As shown in FIG. 3A, the comment text inputted by the user into the text input field 301 is incorporated into the user-generated document 300. The user-generated document 300 is thereby modified, and the modified document may be stored by or in association with the content source 112-1 (e.g., the collaborative document system).

Figure 3B:
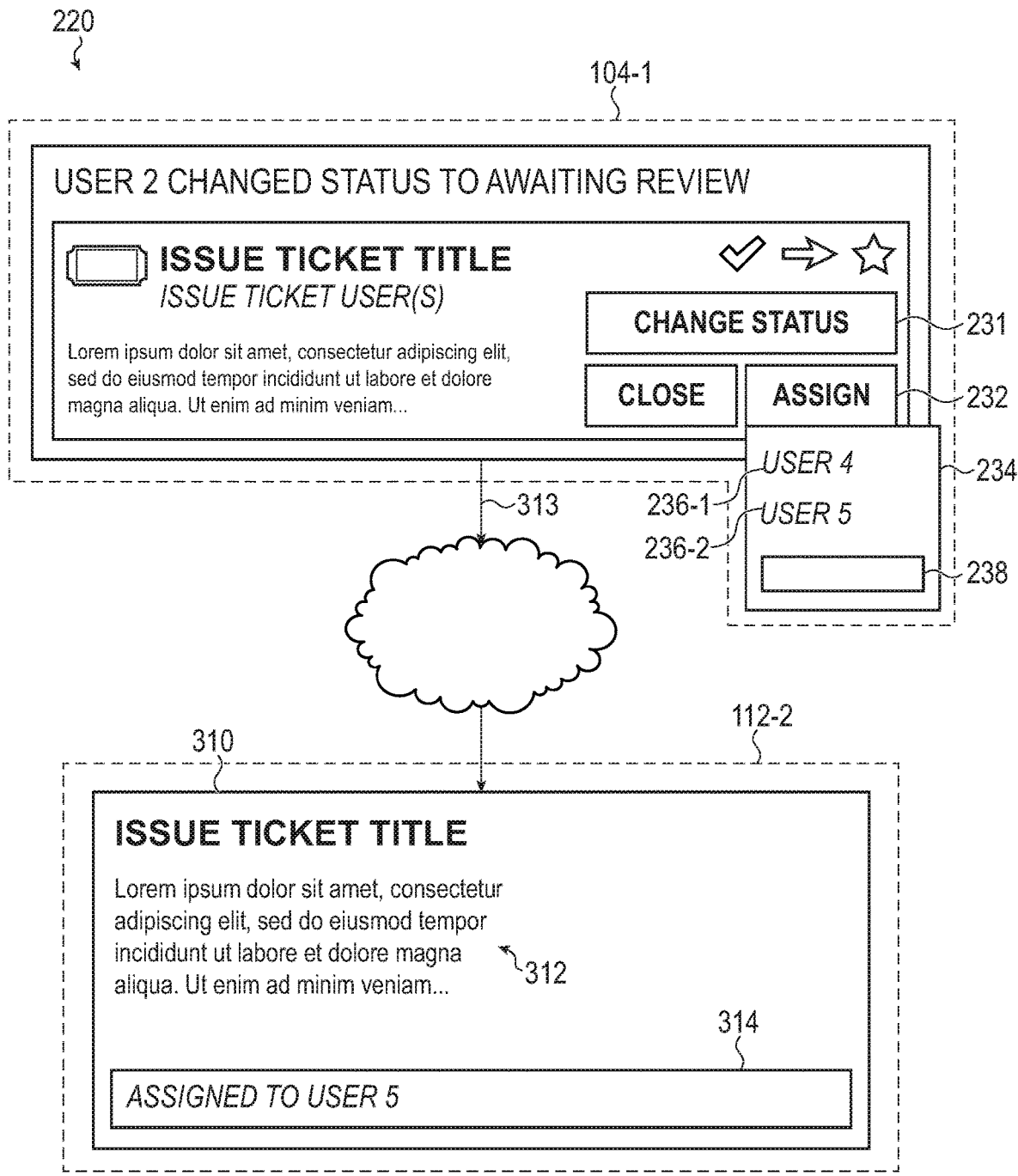

FIG. 3B illustrates how an example user interaction with the actionable input object 232 of the feed item 220 modifies the underlying content item (e.g., an issue ticket 310 of an issue tracking system). For example, the feed item 220 having the actionable input object 232 is displayed to a user in an event feed (e.g., on the client device 104-1). The feed item 220 relates to an event that occurred with respect to a content item. In this example, the content item is an issue ticket 310, and the event is a change in status of the issue ticket 310.

The user selects the actionable input object 232 in a manner that is consistent with the input accepted by the actionable input object. In the case of the actionable input object 232, user selection of the actionable input object includes a selection of a user to whom the issue ticket 310 is to be assigned. For example, upon selection of the actionable input object 232 (e.g., via clicking), an input region 234 that includes a list of candidate users 236 may be displayed. The list of candidate users 236 may include users who have the appropriate authorizations, permissions, and/or roles to be assigned to the issue ticket 310, and may be a subset of all of the users of the issue tracking system. In some cases, the input region 234 may also include a text input field 238 into which a user may manually type or input an identifier of a user to whom the issue ticket 310 is to be assigned. In some cases, the text input field 238 may accept text inputs for association with the issue ticket 310, such as a note or comment provided by the assigning user to the newly assigned user. Such input text may be added to the issue ticket 310 in conjunction with the reassignment of the issue ticket.

In response to the selection of a candidate user 236-2 via the actionable input object 232, an application programming interface (API) call 313 may be issued to the content source 112-2 associated with the underlying content item. The API call 313 may be formulated by the client device 104-1 and issued from the client device 104-1 to the content source 112-2 (e.g., the issue tracking system in which the issue ticket 310 is stored). In another example, the API call 313 may be formulated by and sent to the content source 112-2 from an event feed service 110 (FIG. 1B). For example, the user selection of the actionable input object 232 (including an identifier of the selected user 236-2) may be sent from the client device 104-1 to the event feed service 110, and the event feed service 110 may formulate and send the API call 313 to the content source 112-2. The API call 313 may include information from the user selection of and/or interaction with the actionable input object 232. For example, the API call 313 may include an identifier of the user 236-2 that was selected by the user from the list of candidate users or that was manually inputted by the user in the text input field 238, as well as any text or other content that was provided by the user via the actionable input object 232.

In response to the API call 313, the content source 112-2 modifies the underlying content item as indicated by the API call 313. For example, the API call 313 includes the identifier of the user 236-2 that was selected by the user, along with any associated instructions for assigning the issue ticket 310 to that user (e.g., the task that is required of the assigned user with respect to the issue ticket, a note or comment provided by the assigning user, or the like). As shown in FIG. 3B, the issue ticket 310 is assigned to user 5 (as shown in assignment region 314 of the issue ticket 310). In the case where text or other information is provided via the actionable interface object, the API call 313 may cause the issue ticket 310 to be modified to include that text or information as well.

Figure 4A:
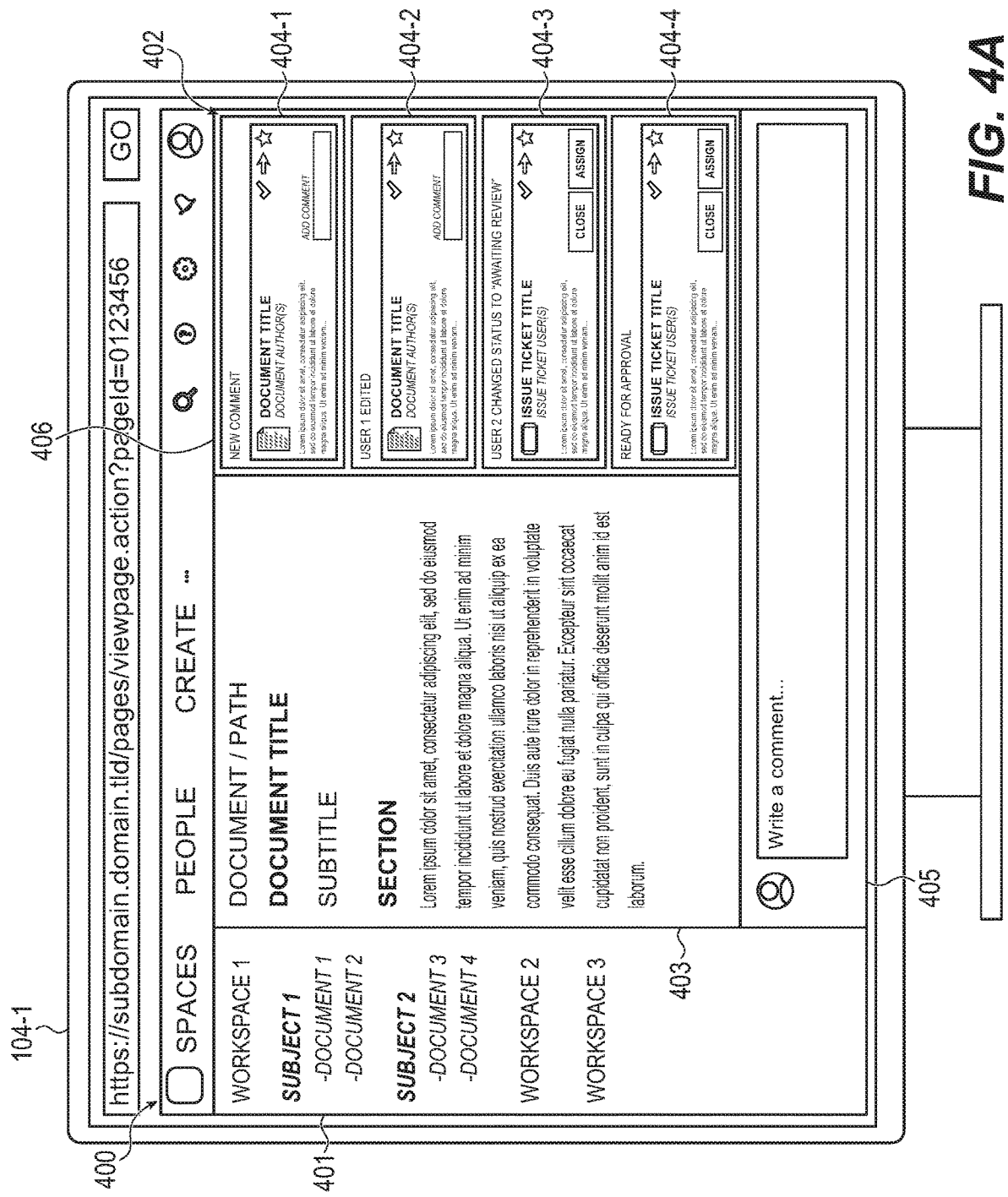
FIGS. 4A-4C depict example event feeds displayed in graphical user interfaces of software programs.
Figure 4B:
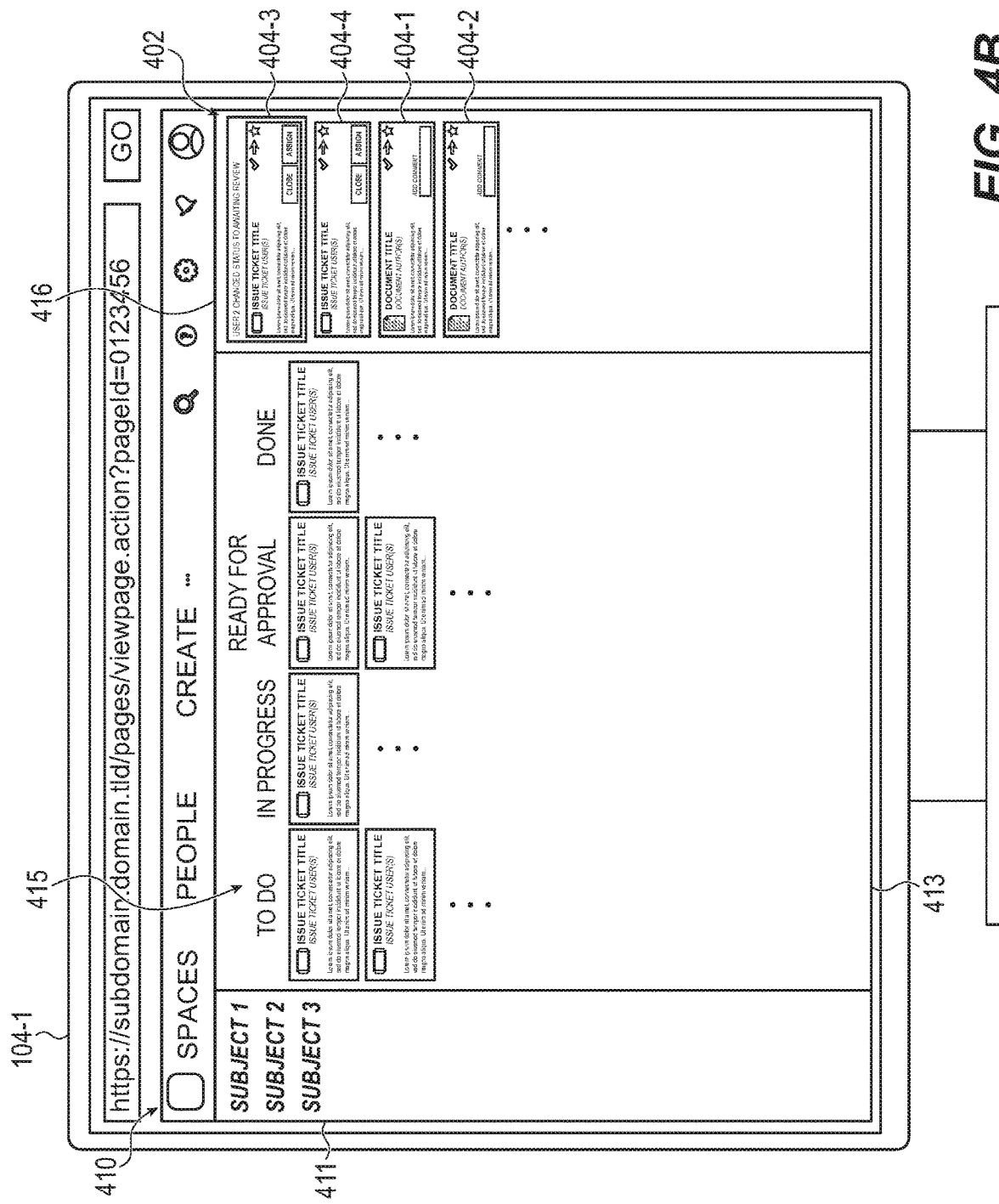

As described above, event feeds may be displayed to users in various different software systems. More particularly, event feeds may be user-specific, rather than application-specific, and as such, a user's event feed may be displayed to the user in multiple different software systems. In some cases, a user's event feed may have a different appearance or different feed settings based on the particular software system in which the event feed is being displayed. FIGS. 4A-4B illustrate an example event feed 402 for a user being displayed in the user interfaces of two different example software systems, illustrating how the same event feed (e.g., the event feed associated with the user) may have different feed settings in the graphical user interfaces of different software systems, leading to the event feed having a different appearance, presentation, and/or function in different software systems.

FIG. 4A illustrates a client device 104-1 displaying an example graphical user interface 400 associated with a collaborative document system (e.g., an example of a software system). The graphical user interface (GUI) 400 may include a document region 403 and a navigation region 401. The document region 403 may display the contents of a selected document, including text, images, videos, interactive content, or the like, and may allow a user to edit the selected document (e.g., to add, change, or remove content). The document region 403 may also include an input field 405 into which a user may input text or other content to add a comment, note, or other content to a document. The navigation region 401 may display a list of workspace identifiers associated with the collaborative document system, as well as subjects and documents associated with each workspace. The GUI 400 is associated with a particular user, and may be customized for that particular user. For example, it may display only those workspaces, subjects, and documents for which the user is authorized.

The GUI 400 may also include an event feed region 406 in which an event feed 402 associated with the user may be displayed. As described herein, the event feed 402 may be unique to the user of the client device 104-1, and may include feed items that relate to content items across multiple different software systems. For example, while the event feed 402 is being displayed in the GUI 400 of a collaborative document system, it includes feed items relating both to documents in the collaborative document system (feed items 404-1, 404-2) and to issue tickets of an issue tracking system (feed items 404-3, 404-4). While only feed items from a collaborative document system and an issue tracking system are shown in FIG. 4A, it will be understood that the example event feed 402 may include feed items related to other content items and/or from other content sources.

Further, the manner in which the event feed 402 is displayed may be based on the particular software system in which it is being displayed. Stated another way, feed settings for the event feed may differ for different software systems. For example, in some cases the order of the feed items 404 in the event feed 402 is based on the software system in which it is displayed. In FIG. 4A, the event feed 402 is displayed in the GUI of a collaborative document system. Accordingly, feed items 404-1 and 404-2, which relate to user-generated documents in the collaborative document system, are prioritized and displayed higher in the list order. This is merely one example, however, and in some cases feed items relating to different software systems or content sources are displayed higher in the list order.

The event feed 402 may be scrollable, such that displayed feed items 404 may be scrolled out of view (e.g., towards the top of the GUI 400), while new feed items 404 may populate at the bottom of the event feed 402. In some cases, the status of a feed item that is scrolled out of view may define how and whether the feed item is reincorporated into the event feed. For example, if the feed item has been marked as read or otherwise acknowledged when it is scrolled out of view (e.g., the user selected the check mark in the feed item), the feed item may be removed from the event feed. If the feed item has been marked for follow-up or favorited when it is scrolled out of view (e.g., the user selected the star in the feed item), the feed item may remain in the event feed and may be displayed in the event feed at a later time. For example, it may appear at the top of the event feed 402 after a predetermined time, or it may be positioned in a lower order in the event feed such that it appears in due course when the user scrolls through the event feed. In some cases, a favorited or otherwise marked feed item may be included in a list of feed items that a user can navigate to and view at any time.

As noted above, event feed preferences may be customized for individual users. Such customizations may be automatically generated based on user interaction histories. For example, event feeds may be ordered based on the way in which a user has historically interacted with the event feeds (e.g., promoting feed items that are similar to others that the user historically interacts with most frequently). Such customizations may also be specified by a user. For example, the user may configure their event feeds to be ordered according to different ordering schemes when the feed is displayed in different application user interfaces. User may also establish automations for feed items. Such automations may control aspects of the feed items themselves (e.g., muting, dismissing, sharing, redirecting, or favoriting feed items related to a particular project or being associated with a particular type of content, or the like), or they may modify or otherwise affect the underlying content item. For example, a user may configure an automation that causes all incoming feed items that request a user assignment to be assigned to a particular user.

FIG. 4B illustrates the client device 104-1 displaying a GUI of a different software system than in FIG. 4A, illustrating how the event feed 402 may be displayed differently in this GUI. For example, FIG. 4B illustrates an example GUI 410 associated with an issue tracking system (e.g., an example of a software system). The GUI 410 may include an issue ticket region 413 and a navigation region 411. The issue ticket region 413 may display representations of issue tickets 415, which may optionally be grouped by their status and arranged in columns. In some cases, a user selection of a representation of an issue ticket 415 causes the GUI 410 to display an issue ticket interface in which a user can review, edit, or otherwise interact with the content of the selected issue ticket. The representations of issue tickets 415 may be grouped based on their status. For example the GUI 410 shows the representations 415 grouped in columns associated with issue ticket statuses.

The navigation region 411 may display a list of subjects with which individual issue tickets may be associated. For example, the subjects may be associated with software applications and/or software code to which the issue tickets relate. As another example, the subjects may be associated with departments in an organization to which issue tickets relate. A user selection of a different subject in the navigation region 411 may cause a different set of issue ticket representations 415 to be displayed in the issue ticket region 413.

The GUI 410 may also include an event feed region 416 in which the event feed 402 associated with the user may be displayed. As described above, because FIG. 4B relates to the same user as FIG. 4A, the event feed 402 may be the same event feed as that shown in the GUI 400 of the collaborative document system. However, because it is being displayed in conjunction with a different software system (e.g., an issue tracking system), the event feed 402 is displayed differently. For example, because the event feed 402 is displayed in the GUI 410 of the issue tracking system, feed items 404-3 and 404-4, which relate to issue tickets in the issue tracking system, are prioritized and displayed higher in the list order. This is merely one example, however, and in some cases feed items relating to different software systems or content sources are displayed higher in the list order. Scrolling and other operations of the event feed 402 in the GUI 410 may be the same or similar as those described with respect to FIG. 4A.

While FIGS. 4A-4B illustrate one example feed setting that may differ between different software systems (e.g., the order of feed items), this is merely one example of a feed setting that may differ. In some cases, other feed settings that may differ include a size of the feed items, a maximum or minimum number of feed items displayed at a given time, an amount of content in each feed item, a location of the event feed, a type of graphical presentation of the event feed, scrolling behavior of the event feed, and the types of feed items that are included in the event feed. Other feed settings are also contemplated.

Figure 4C:
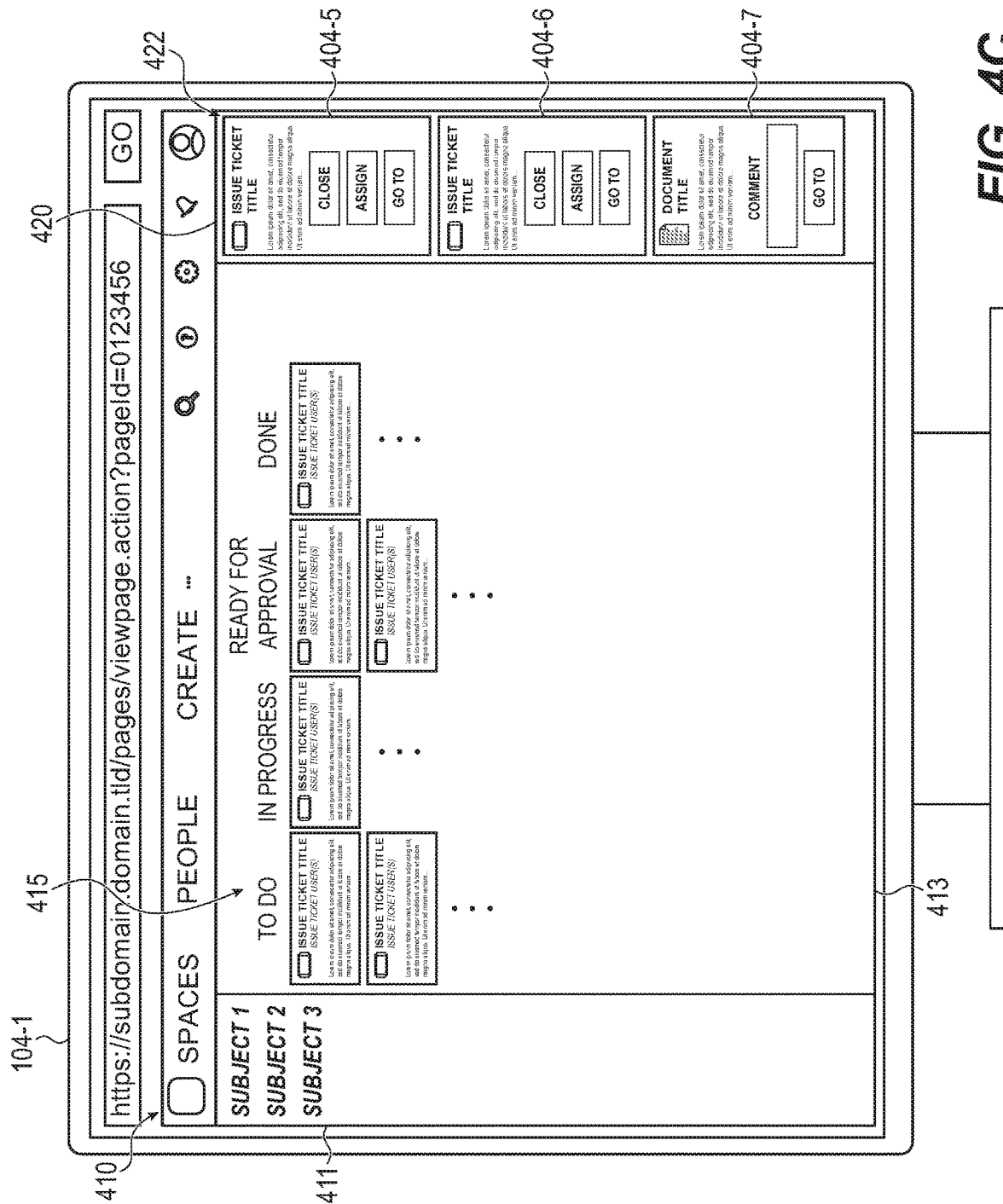

FIG. 4C illustrates the client device 104-1 displaying the same GUI as shown in FIG. 4B, but with a different configuration of the feed items in the event feed. FIG. 4C illustrates that the same feed items may not only be ordered differently in different software application environments, but the feed items themselves may appear differently, even for feed items relating to the same event. For example, the feed items 404-5, 404-6, and 404-7 may relate to the same events as the feed items 404-3, 404-4, and 404-1, respectively. However, while those feed items have one appearance in one GUI (as shown in FIG. 4A), they may have a different appearance in a different GUI (as shown in FIG. 4C). In some cases, the feed items may have different actionable input objects or other controls based on the GUI in which they are displayed. For example, FIG. 4C illustrates example feed items that include a "go to" option that, when selected, causes the issue ticket to which the feed item refers to be displayed. Other types of actionable input objects or other controls may be selectively displayed in feed items based on factors such the content item to which the feed item relates, the software system GUI that the feed item is being displayed in, or the like. In some cases, feed items relating to a certain type of content item may have fewer actionable input objects when they are displayed in a GUI associated with that type of content item (e.g., because the GUI may provide more comprehensive controls for those content items).

Figure 5A:
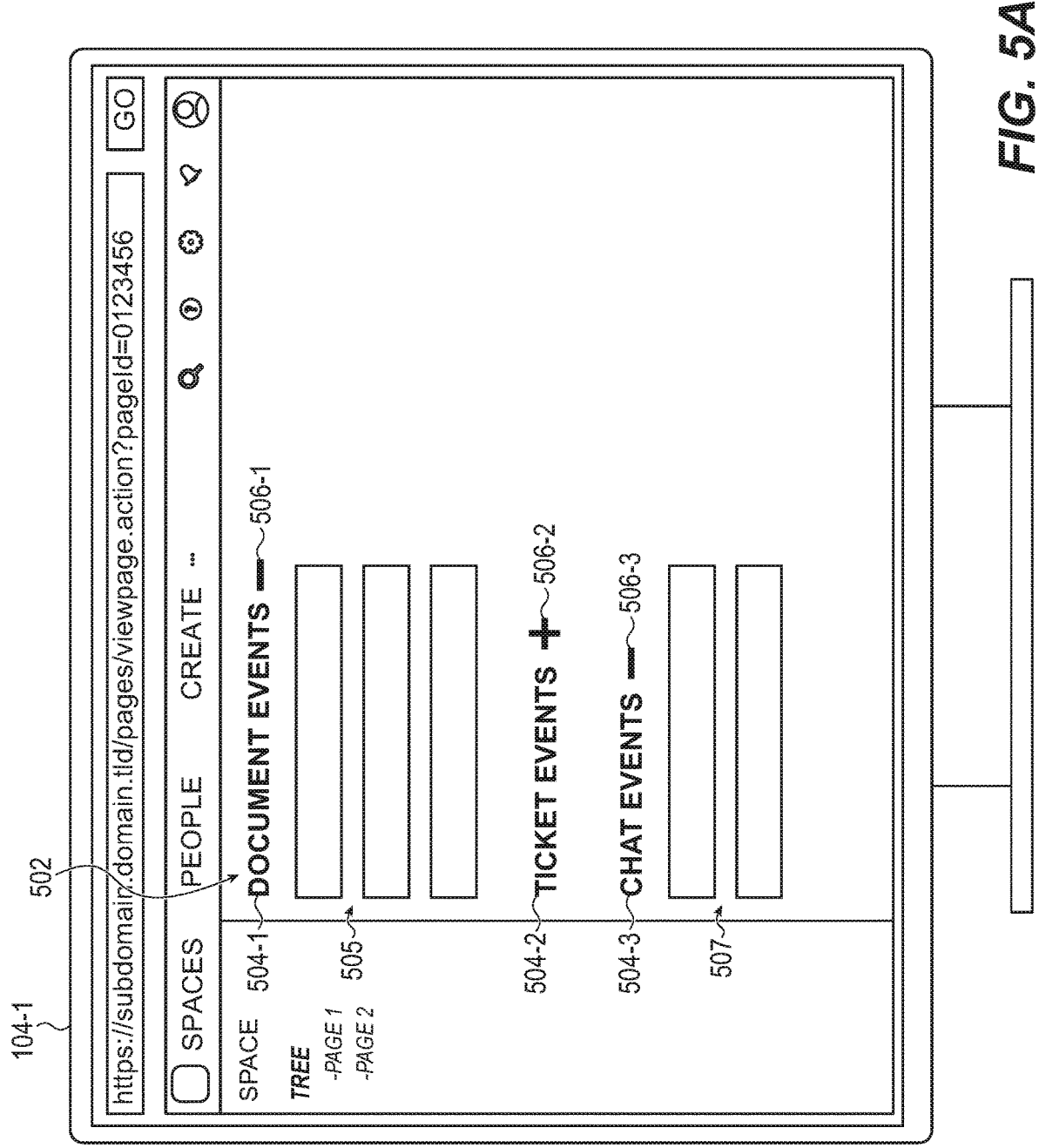
FIGS. 5A-5B depict example graphical arrangements of event feeds displayed in graphical user interfaces of software programs.
Figure 5B:
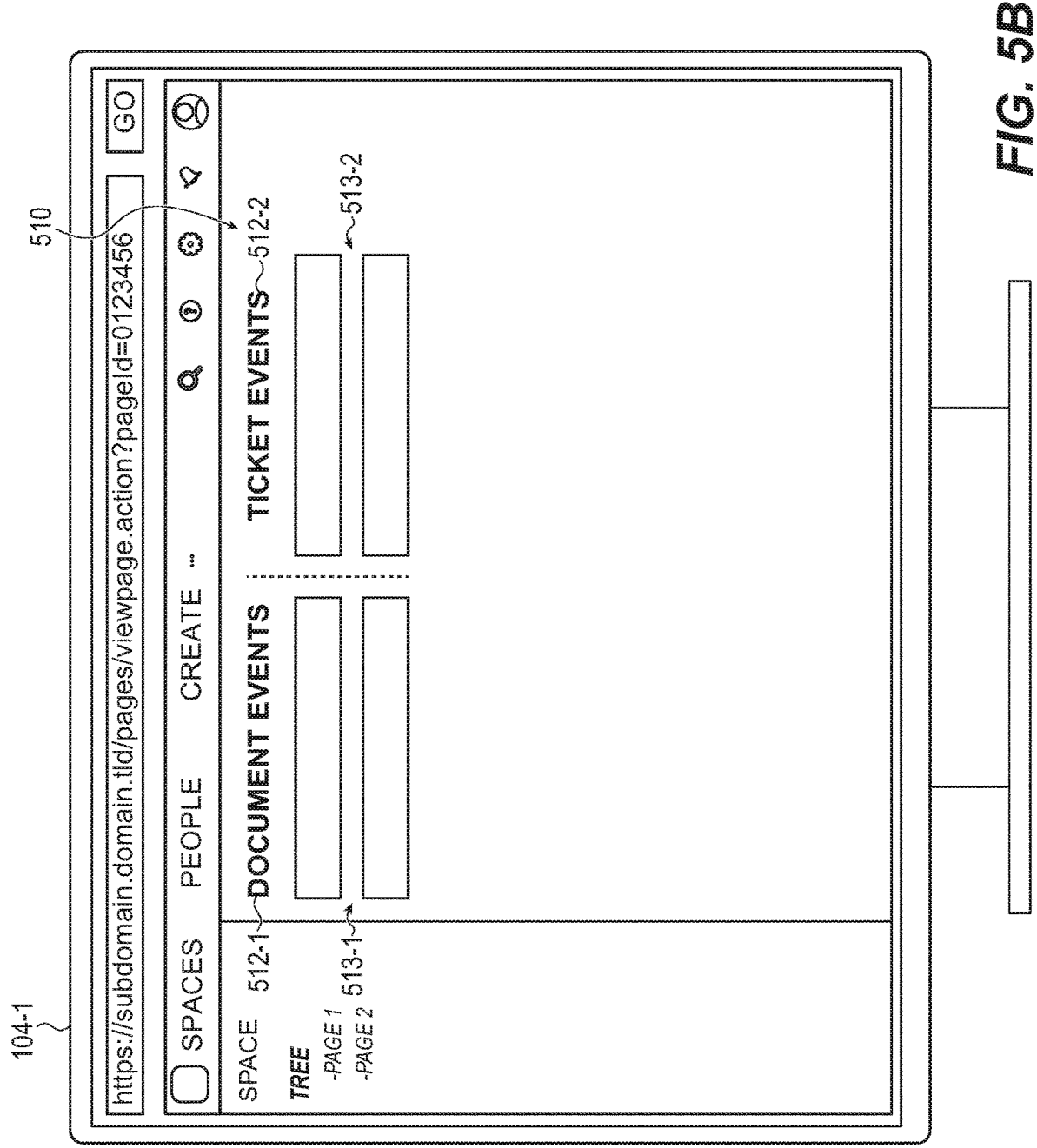

FIGS. 4A-4C illustrate an example arrangement of the event feed 402 in which the feed items are displayed in a list format in a single column. However, this is merely one example graphical presentation of an event feed. FIGS. 5A-5B illustrate other example graphical presentations of the event feed. In some cases, the graphical presentation of the event feed may be an event feed setting that may be specified for different software systems. Thus, for example, an event feed setting may indicate that the event feed should be displayed according to a first graphical presentation when the event feed is displayed in the GUI of a first software system, and according to a second graphical presentation when displayed in the GUI of a second software system.

FIG. 5A illustrates the client device 104-1 displaying an event feed 502 with collapsible groupings. Feed items 505 in the event feed 502 may be grouped according to a scheme. For example, in FIG. 5A, the feed items may be grouped according to the type of content item to which each feed item relates (e.g., document events 504-1, ticket events 504-2, and chat events 504-3). The groupings 504 may be individually expanded to reveal the feed items within that grouping, or collapsed to hide the feed items within that grouping. An input object 506 may be provided to toggle a grouping 504 between an expanded and a collapsed appearance. FIG. 5A shows the groupings 504-1 and 504-3 in an expanded state, displaying feed items 505 and 507, respectively, and grouping 504-2 in a collapsed state. Feed items may be independently scrolled within a grouping, and the scrolling operations may be the same as those described above. Further, the overall event feed may be scrolled. While FIG. 5A shows the event feed 502 in a main portion of a graphical user interface, this is merely for illustrative purposes, and the event feed with collapsible groupings may be displayed in any suitable region of a GUI for a software application as described herein. For example, the event feed 502 may be displayed in the event feed regions 406, 416 in FIGS. 4A-4B.

While FIG. 5A illustrates feed items grouped according to content item type, other groupings are also contemplated. For example, in an organization, a departure of an individual may result in changes to multiple different content items, tasks, or the like. For example, each issue that was assigned to that individual may need to be assigned to someone else, each user-generated document for which that individual was an editor or reviewer may need to be assigned a new reviewer, or the like. When a departure of an individual occurs, a grouping of feed items that were triggered as a result of that departure (or otherwise related to that departure) may be shown in a collapsible grouping. As another example, a grouping may relate to a project (e.g., including feed items from multiple software systems, with each feed item related to the same project), a software application in development (e.g., including feed items from multiple software systems, with each feed item related to the same software application).

Feed items may also be filtered, grouped, or ordered based on historical interaction data associated with a user. In particular, an event feed service or other component of an application services system may track interactions between a user and feed items and use those interactions to determine how to display feed items. For example, if a user typically acts on a certain type of feed item (e.g., a feed item requesting approval of a status change of an issue ticket) one day before they are due, the event feed service may configure the event feed for that user to display those types of feed items at the top of the event feed on the day before they are due. As another example, if a user typically ignores or dismisses feed items related to particular type of feed item, the event feed service may cease displaying those types of feed items, display them less prominently, or display them in a lower rank order in the event feed. Various attributes of feed items and various attributes of user interactions may be used to determine how to display feed items. For example, if a user frequently ignores feed items that lack actionable input objects, the event feed service may deprioritize feed items that lack actionable input objects or generate a grouping for those feed items (e.g., a low-priority grouping); if a user frequently interacts with feed items relating to a particular project or subject matter, the event feed service may prioritize those feed items (e.g., display them more prominently or higher in a rank order), or generate a grouping based on that project and include the feed items in that grouping; if a user frequently assigns issue tickets associated with a particular issue to a particular user, feed items associated with that issue and requiring a user assignment may be grouped and displayed with a recommendation to assign the issue tickets to that particular user. Other feed item attributes and user interactions may also be used by an event feed service to dynamically modify how event feeds and feed items are displayed to a user.

FIG. 5B illustrates the client device 104-1 displaying an event feed 510 according to yet another feed setting, in which feed items 513 are associated with groupings, and each grouping is shown in a separate column. In FIG. 5B, the feed items 513 may be grouped according to the type of content item to which each feed item relates (e.g., document events 512-1, ticket events 512-2). In some cases, each column may be individually expanded to reveal the feed items within that column, or collapsed to hide the feed items within that column, similar to the expanding and collapsing groups described with respect to FIG. 5A. Feed items 513 may be independently scrolled within a column, and the scrolling operations may be the same as those described above for a full event feed. Further, the columns may also be scrolled (e.g., left and right, as shown in FIG. 5B) to reduce the size of the event feed and allow a user to focus on the column(s) and feed items that are most relevant to the user. While FIG. 5B shows the event feed 510 in a main portion of a graphical user interface, this is merely for illustrative purposes, and the event feed 510 may be displayed in any suitable region of a GUI for a software application as described herein. For example, the event feed 510 may be displayed in the event feed regions 406, 416 in FIGS. 4A-4B.

In the foregoing examples, event feeds are shown as having feed items with actionable input objects that, when selected by a user, modify an underlying content item to which the feed item relates. Event feeds may also include other types of feed items, including feed items that do not include actionable input objects. Further, the event feeds described herein may include feed items from software applications, content sources, or other services other than those listed herein.

Figure 6:
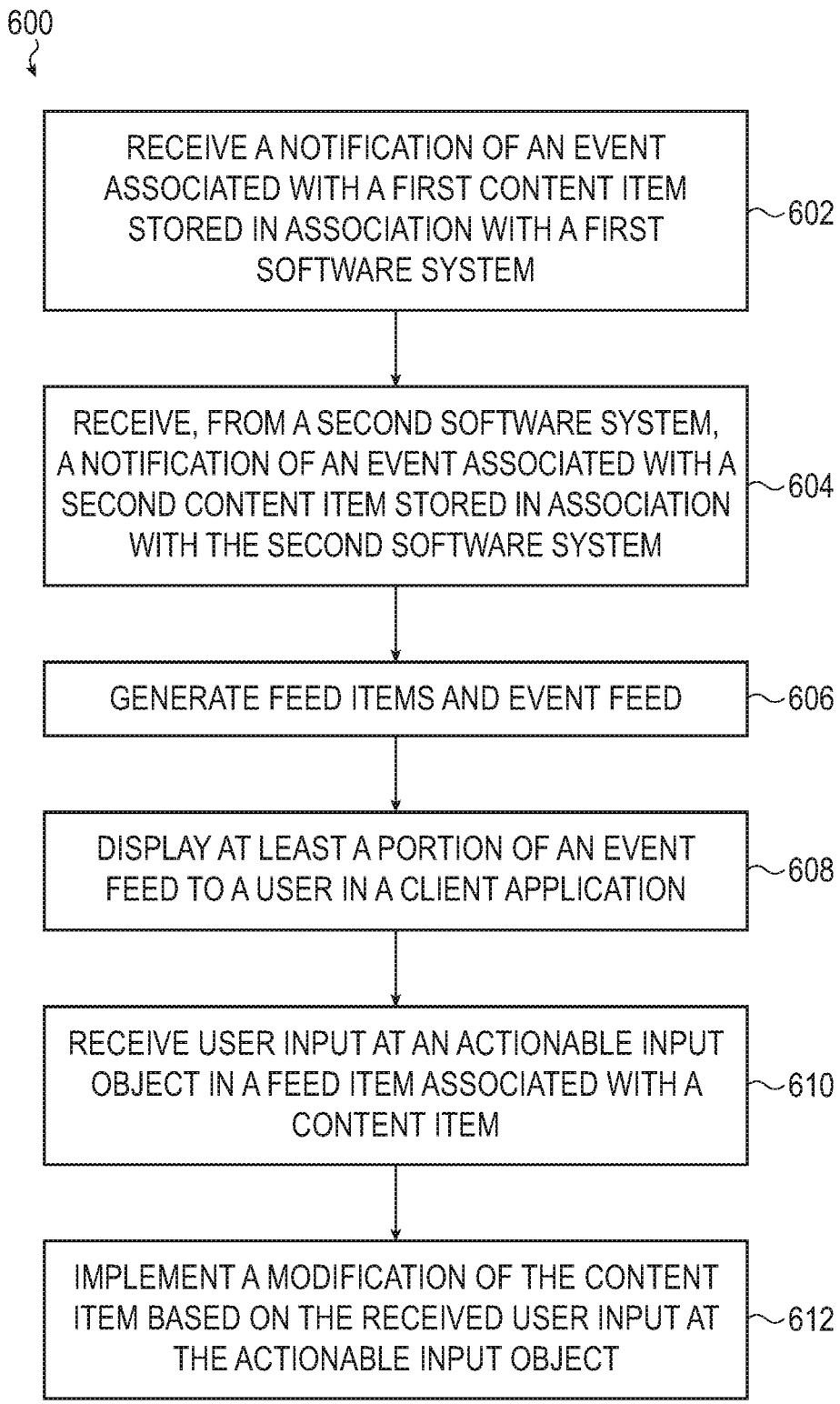
FIG. 6 depicts an example process for generating and displaying an event feed with actionable input objects.

FIG. 6 is a flow chart of an example process 600 for generating and displaying an event feed to a user. The process 600 may be performed by devices and/or services of the system 100, including, for example, an application services system 102 and associated event feed service 110. The event feed service 110 may be configured to generate an event feed for display to a user, based at least in part on notifications received by the event feed service 110 from one or more software systems (e.g., content sources 112, FIG. 1A).

At operation 602, an event feed service (e.g., the event feed service 110), receives, from a first software system, a notification of an event associated with a first content item stored in association with the first software system and associated with a user. The first software system may be, for example, a content source such as the content source 112-2. In some cases, the software system may be an issue tracking system comprising a plurality of issue tickets, and the notification of the event may relate to an issue ticket of the issue tracking system.

At operation 604, the event feed service receives, from a second software system, a notification of an event associated with a second content item stored in association with the second software system and associated with the user. The second software system may be, for example, a content source such as the content source 112-1. In some cases, the software system may be a collaborative document system comprising a plurality of user-generated documents, and the notification of the event may relate to a user-generated document of the collaborative document system.

At operation 606, the event feed service generates feed items and an event feed for the user. Generating feed items may include receiving at least part of the content of a content item, and generating a feed item with the received content. For example, the event feed service may receive a portion of user-generated content of a user-generated document, or a portion of a user-generated specification of an issue in computer code, or a title of a content item, or an author (or other metadata) of a content item. In some cases, the event feed services generates definitions of feed items, where the definitions include an address of content (in a content item) that is to be included in the feed item. The definition of the feed item may be provided to a client device, which causes the client device to retrieve the content using the address. The event feed service may generate feed items using the received content, and associate feed items with individual users to generate a user's event feed.

At operation 608, at least a portion of an event feed is displayed to the user in a client application. As noted above, the event feed may be generated by the event feed service (e.g., the event feed services 110). The event feed may include a first feed item that includes at least a portion of the first content item, and a first actionable input object configured to cause a change to the first content item based on a first user input received at the first actionable input object. For example, the feed item 220 in FIG. 2B includes a portion of the underlying content item (e.g., the content preview 226), as well as actionable input objects 230, 232. As described above, the actionable input objects 230, 232 are configured to modify the underlying content item (e.g., they modify the issue ticket to which the feed item 220 relates).

The event feed may further include a second feed item that includes at least a portion of the second content item, and a second actionable input object configured to cause a change to the second content item based on a second user input received at the second actionable input object. For example, the feed item 200 in FIG. 2A includes a portion of the underlying content item (e.g., the content preview 206), as well as an actionable input object 210. As described above, the actionable input object 210 is configured to modify the underlying content item (e.g., it modifies the user-generated document to which the feed item 200 relates).

At operation 610, a user input is received at one or more of the actionable input objects displayed in a feed item in relation to a content item. For example, a user may provide an input to an actionable input object to provide text or other content that is to be input in a content item, or a selection of a user to whom a content item is to be assigned, or a selection of a virtual button that changes a status of a content item, or the like.

At operation 612, a modification of the content item is implemented based on the received user input at the actionable input object. Example modifications of the content item are described herein, and include adding, removing, or editing content (e.g., text, images, etc.) of a user-generated document, changing a status of an issue ticket, assigning an issue ticket, approving a change to a content item such as an issue ticket or user-generated document, or the like. Other modifications of content items are also contemplated.

The implementation of the modification may be performed in various ways. For example, the event feed service may receive the user input or information about the user input, and communicate with a software system associated with the content item to implement the modification. In some cases, the event feed service (or another device or service of the system 100) formulates an application programming interface (API) call based at least in part on the user input provided to the actionable input object (e.g., text input, a selection of a virtual button, etc.). The API call may be issued to a software system associated with the content item (e.g., a collaborative document system, an issue tracking system, etc.), thereby causing the content item to be modified based on the user input. Operations 608 and 610 may be repeated for as many actionable input objects as may be selected from an event feed.

Figure 7:
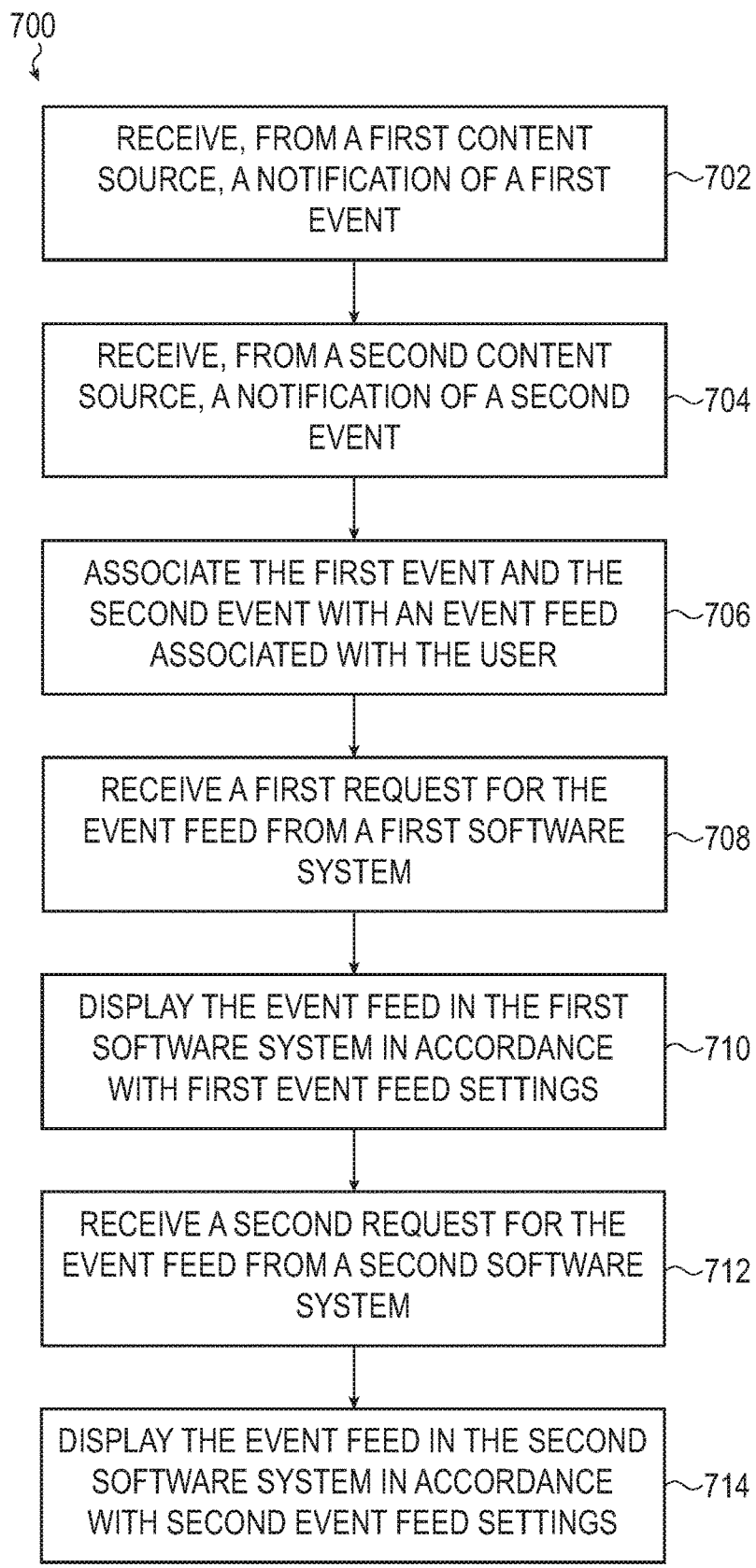
FIG. 7 depicts an example process for displaying an event feed to a user in graphical user interfaces of multiple software systems.

FIG. 7 is a flow chart of an example process 700 for displaying an event feed to a user in graphical user interfaces of multiple software systems. The process 700 may be performed by devices and/or services of the system 100, including, for example, an application services system 102 and associated event feed service 110. The event feed service 110 may be configured to generate an event feed for display to a user, based at least in part on notifications received by the event feed service 110 from one or more software systems (e.g., content sources 112, FIG. 1A).

At operation 702, a notification of a first event is received from a first content source. The notification is associated with a first content item stored in association with the first content source and associated with the user. At operation 704, a notification of a second event is received from a second content source. The notification is associated with a second content item stored in association with the second content source and associated with the user. The notifications may relate to any of various types of events relating to a content item, such as a content item having been modified or changed, a status of the content item having been changed, a due date associated with the content item approaching or passing, or the like.

At operation 706, the first event and the second event are associated with an event feed associated with the user. In particular, the events may relate to content items that are related to or implicate the user. For example, the user may be an author or reviewer of a user-generated document, and events related to that user-generated document (e.g., edits or changes to the document) may therefore be included in that user's event feed. As another example, the user may be an owner or supervisor associated with an issue ticket, and changes to the issue ticket (e.g., changes to the status, requests for review, etc.) may therefore be included in the user's event feed.

At operation 708, a first request for the event feed may be received from a first software system, and in response to receiving the first request for the event feed, the event feed may be displayed (operation 710) in the first software system in accordance with first event feed settings. For example, as described above with respect to FIG. 4A, while a GUI associated with a software system (e.g., a collaborative document system) is being displayed on a client device, the software system may request the event feed. The event feed service 110 may send the event feed to the client device for display in the GUI of the software system. The feed may be displayed according to feed settings that are specific for that software system, such as the feed item order described with respect to FIG. 4A.

At operation 712, a second request for the event feed may be received from a second software system, and in response to receiving the second request for the event feed, the event feed may be displayed (operation 714) in the second software system in accordance with second event feed settings, which may be different from the first event feed settings. For example, while FIG. 4A illustrates an example of a first software system requesting and displaying the event feed, FIG. 4B illustrates an example of a second software system (e.g., an issue tracking system) requesting and displaying the same event feed. As described above with respect to FIG. 4B, the same event feed is displayed in the GUI of the second software system according to different feed settings than the first software system. For example, the event feed may be displayed in a different feed item order, or a different graphical arrangement of feed items (e.g., as shown in FIGS. 5A-5B), or the like.

Figure 8:
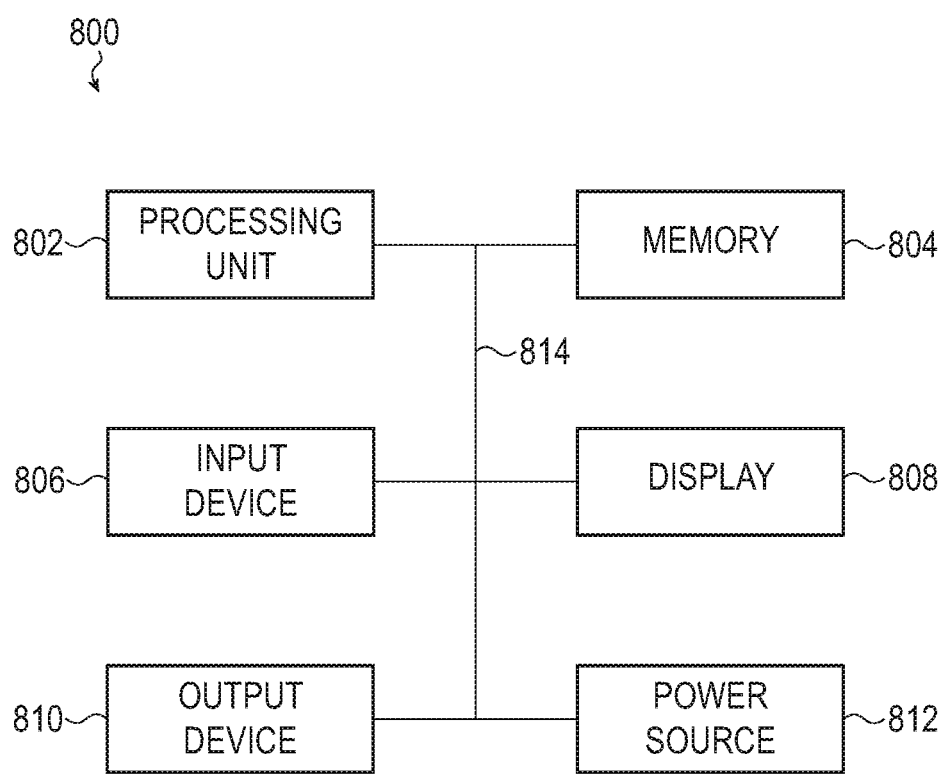
FIG. 8 depicts an example electrical block diagram of an electronic device that may perform the operations described herein.

FIG. 8 illustrates a sample electrical block diagram of an electronic device 800 that may perform the operations described herein. The electronic device 800 may in some cases take the form of any of the electronic devices described with reference to FIGS. 1A-5B, including client devices 104 and/or servers or other computing devices associated with the networked computer system 100 (e.g., the application services system 102, the event feed service 110, content sources 112, third party content sources 108, etc.). The electronic device 800 can include one or more of a display 808, a processing unit 802, a power source 812, a memory 804 or storage device, input devices 806, and output devices 810. In some cases, various implementations of the electronic device 800 may lack some or all of these components and/or include additional or alternative components.

The processing unit 802 can control some or all of the operations of the electronic device 800. The processing unit 802 can communicate, either directly or indirectly, with some or all of the components of the electronic device 800. For example, a system bus or other communication mechanism 816 can provide communication between the processing unit 802, the power source 812, the memory 804, the input device(s) 806, and the output device(s) 810.

The processing unit 802 can be implemented as any electronic device capable of processing, receiving, or transmitting data or instructions. For example, the processing unit 802 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 800 can be controlled by multiple processing units. For example, select components of the electronic device 800 (e.g., an input device 806) may be controlled by a first processing unit and other components of the electronic device 800 (e.g., the display 808) may be controlled by a second processing unit, where the first and second processing units may or may not be in communication with each other.

The power source 812 can be implemented with any device capable of providing energy to the electronic device 800. For example, the power source 812 may be one or more batteries or rechargeable batteries. Additionally or alternatively, the power source 812 can be a power connector or power cord that connects the electronic device 800 to another power source, such as a wall outlet.

The memory 804 can store electronic data that can be used by the electronic device 800. For example, the memory 804 can store electronic data or content such as, for example, audio and video files, documents and applications, device settings and user preferences, timing signals, control signals, and data structures or databases. The memory 804 can be configured as any type of memory. By way of example only, the memory 804 can be implemented as random access memory, read-only memory, Flash memory, removable memory, other types of storage elements, or combinations of such devices.

In various embodiments, the display 808 provides a graphical output, for example associated with an operating system, user interface, and/or applications of the electronic device 800 (e.g., a graphical user interface associated with a collaborative document system, which may include graphical elements related to delivering document template recommendations, displaying documents, displaying document templates from which documents may be generated, displaying a workspace and/or document hierarchy, etc.). In one embodiment, the display 808 includes one or more sensors and is configured as a touch-sensitive (e.g., single-touch, multi-touch) and/or force-sensitive display to receive inputs from a user. For example, the display 808 may be integrated with a touch sensor (e.g., a capacitive touch sensor) and/or a force sensor to provide a touch- and/or force-sensitive display. The display 808 is operably coupled to the processing unit 802 of the electronic device 800.

The display 808 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 808 is positioned beneath and viewable through a cover that forms at least a portion of an enclosure of the electronic device 800.

In various embodiments, the input devices 806 may include any suitable components for detecting inputs. Examples of input devices 806 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 806 may be configured to detect one or more particular types of input and provide a signal (e.g., an input signal) corresponding to the detected input. The signal may be provided, for example, to the processing unit 802.

As discussed above, in some cases, the input device(s) 806 include a touch sensor (e.g., a capacitive touch sensor) integrated with the display 808 to provide a touch-sensitive display. Similarly, in some cases, the input device(s) 806 include a force sensor (e.g., a capacitive force sensor) integrated with the display 808 to provide a force-sensitive display.

The output devices 810 may include any suitable components for providing outputs. Examples of output devices 810 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 810 may be configured to receive one or more signals (e.g., an output signal provided by the processing unit 802) and provide an output corresponding to the signal.

In some cases, input devices 806 and output devices 810 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 802 may be operably coupled to the input devices 806 and the output devices 810. The processing unit 802 may be adapted to exchange signals with the input devices 806 and the output devices 810. For example, the processing unit 802 may receive an input signal from an input device 806 that corresponds to an input detected by the input device 806. The processing unit 802 may interpret the received input signal to determine whether to provide and/or change one or more outputs in response to the input signal. The processing unit 802 may then send an output signal to one or more of the output devices 810, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method for displaying an event feed to a user comprising:
   at an event feed service in communication with an issue tracking system and a collaborative document system:
   receiving, from the issue tracking system comprising a plurality of issue tickets, a notification of an event associated with an issue ticket and a reference to the issue ticket; and
   receiving, from the collaborative document system comprising a plurality of user-generated documents, a notification of an event associated with a user-generated document and including a reference to the user-generated document;
   causing display of a graphical user interface of the collaborative document system comprising:
   a document region displaying document content of the user-generated document of the plurality of user-generated documents; and an event feed including a plurality of feed items, wherein feed items related to the plurality of user-generated documents including other user-generated documents are prioritized in the event feed over feed items related to content items managed by other platforms, including one or more content items managed by the issue tracking system, and wherein the plurality of feed items comprise:
  a first feed item including:
    content from the issue ticket; and
    a first actionable input object operable to cause a modification of the issue ticket in response to a first user input directed to the first actionable input object; and
  a second feed item including:
    content from the user-generated document; and
    a second actionable input object operable to cause a modification of the user-generated document in response to a second user input directed to the second actionable input object;
in response to the first user input directed to the first actionable input object, causing the modification to the issue ticket to be implemented on the issue tracking system;
in response to the second user input directed to the second actionable input object, causing the modification to the user-generated document to be implemented on the collaborative document system; and
subsequent to the modification to the user-generated document, causing the document region to display a corresponding modification to the document content of the user-generated document within the document region of the graphical user interface.

2. The method of claim 1, wherein:
the content from the user-generated document is a first content from the user-generated document;
the method further comprises receiving, from the user, a second content via the second actionable input object; and
the modification of the user-generated document comprises adding the second content to the user-generated document.

3. The method of claim 1, wherein:
the issue ticket includes a user-generated specification of an issue in computer code of a software product; and
the modification of the issue ticket changes a status of the issue.

4. The method of claim 1, further comprising:
receiving, from the issue tracking system, the content from the issue ticket;
generating the first feed item, the first feed item comprising:
  a title of the issue ticket;
  the first actionable input object;
  a third actionable input object operable to cause the issue tracking system to assign the issue ticket to a second user; and
sending the first feed item to a software system for display to the user in the event feed.

5. The method of claim 1, further comprising:
generating a definition of the first feed item, the definition of the first feed item including an address of the content from the issue ticket; and
sending the definition of the first feed item to a software system, wherein the definition of the first feed item is configured to cause the software system to retrieve the content from the issue tracking system using the address of the content from the issue ticket.

6. The method of claim 1, wherein:
the first actionable input object includes a button object configured to cause a status of the issue ticket to be changed when selected by the user;
the second actionable input object includes a text input field configured to receive a text input from the user; and
the modification of the user-generated document includes adding the received text input to the user-generated document.

7. The method of claim 1, wherein the event feed further comprises:
a third feed item including:
  content from a second user-generated document of the other user-generated documents; and
  a third actionable input object operable to cause a modification of the second user-generated document in response to a third user input directed to the third actionable input object.

8. A method comprising:
at an event feed service configured to generate an event feed for display to a user:
  receiving, from a first software system, a notification of an event associated with a first content item stored in association with the first software system and associated with the user;
  receiving, from a second software system, a notification of an event associated with a second content item stored in association with the second software system and associated with the user;
causing display of a graphical user interface of the second software system comprising:
  a document region displaying content of the second content item; and
  an event feed including a plurality of feed items, wherein feed items related to content items of the second software system are prioritized in the event feed over feed items related to content items of the first software system, and wherein the plurality of feed items comprising comprise:
    a first feed item including:
      at least a portion of the first content item; and
      a first actionable input object operable to cause a change to the first content item based on a first user input received at the first actionable input object; and
    a second feed item including:
      at least a portion of the second content item; and
      a second actionable input object operable to cause a change to the second content item based on a second user input received at the second actionable input object;
  in response to the first user input directed to the first actionable input object, causing the change to the first content item to be implemented on the first software system;
  in response to the second user input directed to the second actionable input object, causing the change to the second content item to be implemented on the second software system; and
  subsequent to the change to the second content item, causing the document region to display a corresponding change to the content of the second content item within the document region of the graphical user interface.

9. The method of claim 8, wherein:
the first user input comprises content inputted, by the user, into the first actionable input object; and
the change to the first content item comprises the content inputted by the user.

10. The method of claim 9, wherein causing the change to the first content item based on the first user input includes adding the content inputted by the user to the first content item.

11. The method of claim 8, wherein:
the change to the first content item is implemented through an API call issued by the second software system to the first software system.

12. The method of claim 8, wherein:
the first content item is an issue ticket from an issue tracking system, the issue ticket including a user-generated specification of an issue in computer code of a software product; and
the event associated with the first content item is at least one of:
a change in a status of the issue ticket;
an assignment of the issue ticket to the user; or
an addition of user-generated content to the issue ticket.

13. The method of claim 8, wherein:
the second content item is a user-generated document from a collaborative document system; and
the event associated with the second content item is at least one of:
an edit to the user-generated document; or
an inclusion of a username associated with the user in the user-generated document.

14. The method of claim 8, further comprising, at the event feed service:
in response to receiving the notification of the event associated with the first content item, generating a first specification of the first feed item;
receiving, from the second software system, a second specification of the second feed item; and
sending the first specification of the first feed item and the second specification of the second feed item to the graphical user interface of the second software system.

15. The method of claim 8, wherein the event feed further comprises:
a third feed item including:
content from a second content item of the second software system; and
a third actionable input object operable to cause a modification of the second content item in response to a third user input directed to the third actionable input object.

\* \* \* \* \*